United States Patent [19]

Stafford et al.

[11] 4,240,140

[45] Dec. 16, 1980

[54] CRT DISPLAY TERMINAL PRIORITY INTERRUPT APPARATUS FOR GENERATING VECTORED ADDRESSES

[75] Inventors: John P. Stafford, Nashua, N.H.; Minoru Inoshita, Glendale, Ariz.; Gerald N. Winfrey, Billerica, Mass.

[73] Assignee: Honeywell Information Systems Inc., Waltham, Mass.

[21] Appl. No.: 973,462

[22] Filed: Dec. 26, 1978

[51] Int. Cl.³ ............................ G06F 9/36; G06F 9/46
[52] U.S. Cl. .................................................. 364/200
[58] Field of Search ... 364/200 MS File, 900 MS File

[56] References Cited

U.S. PATENT DOCUMENTS

| 3,302,177 | 1/1967 | Bina | 364/200 |
|---|---|---|---|
| 3,566,358 | 2/1971 | Hasbrouck | 364/200 |
| 3,881,174 | 4/1975 | Barnich | 364/200 |
| 4,003,033 | 1/1977 | O'Keefe et al. | 364/200 |
| 4,030,075 | 6/1977 | Barlow | 364/200 |
| 4,090,238 | 5/1978 | Russo | 364/200 |
| 4,157,761 | 5/1979 | Louie | 364/200 |

*Primary Examiner*—Harvey E. Springborn

*Attorney, Agent, or Firm*—George Grayson; Nicholas Prasinos; Ronald T. Reiling

[57] ABSTRACT

A cathode ray tube display terminal system includes a central processor subsystem and a number of certain peripheral subsystems all of which are coupled in common to a system bus. Apparatus in the central processor subsystem receives interrupt request signals from certain of the peripheral subsystems and on a predetermined priority basis modifies an address generated by the central processor subsystem in dependence upon which of the requesting certain peripheral subsystems has the highest priority. The modified address, called a vectored address points to a firmware subroutine stored in a memory subsystem which is also coupled to the system bus and which processes the interrupt from the highest priority cetain peripheral subsystem. Other peripheral subsystems coupled to the system bus generate a single interrupt signal which is also applied to the apparatus in the central processor system. The highest priority other peripheral subsystem generating the single interrupt signal responds to an interrupt acknowledge signal from the central processor subsystem by sending address signals to the apparatus which are used to modify the address generated by the central processing subsystem so as to produce the vectored address.

5 Claims, 15 Drawing Figures

TIMING & CONTROL SUB SYSTEM 2

INTERRUPT AND PRIORITY LOGIC 4-24

CRT DISPLAY TERMINAL PRIORITY INTERRUPT APPARATUS FOR GENERATING VECTORED ADDRESSES

BACKGROUND OF THE INVENTION

1. Field of the Invention

This invention relates generally to a cathode ray tube display terminal system which includes a cathode ray tube display subsystem, a central processor subsystem, and a plurality of peripheral subsystems, all coupled in common to a system bus. The invention relates particularly to apparatus which, in response to interrupt signals from one or more subsystems, generates address signals which call for firmware routines to process the interrupt from a selected subsystem.

2. Description of the Prior Art

A cathode ray display system is made up of a number of subsystems, including a central processor subsystem, all coupled to a common bus. When a subsystem requests attention, it sends an interrupt signal on the bus to the central processor subsystem. In the prior art system the central processor subsystem would poll the subsystems to determine which subsystem interrupted. The central processor subsystem would then process the interrupt and generate a unique interrupt vector address on the bus. This required the central processor to utilize hardware and firmware to poll all the devices in the subsystem, prioritize those devices with active interrupts and generate the unique interrupt vectored address to enter into the firmware interrupt service routine.

There are various other types of interrupt processing systems in the prior art which are coupled to provide interrupt service in response to an interrupt signal received from any one of a number of sources such as peripherals connected to an input/output bus. Typically the procedure followed for servicing interrupts from such peripherals first requires identifying the interrupting peripherals, next requesting the status of the peripheral and then updating the status. This procedure is relatively slow and in certain types of systems where interrupt routines are executed frequently, the acknowledge routine time may pose serious speed restraints on the total system. In one such interrupt system, as indicated in U.S. Pat. No. 3,881,174, the interrupt processing apparatus includes a computer which allows a peripheral, upon receiving an acknowledgement from a computer of an interrupt request which the peripheral previously generated to simultaneously provide the computer with its address and status thereby shortening the time required for the interrupt routine.

U.S. Pat. No. 4,030,075 describes a data processing system having a distributed priority network. This priority network is coupled with each of the units and indicates which is the highest priority unit requesting to transfer information over the bus. The priority network includes a priority bus with the units coupled closest to one end of the bus having a highest priority and units coupled at the other end of the bus having a lowest priority. All of the above systems have the disadvantage of having considerable hardware and time consuming cycles to perform the connection to the bus.

The Honeywell 7760 display system is a central processor subsystem which controls a fixed number of peripheral subsystems. The 7760 is described in "VIP 7760 Subsystem User's Reference Manual", AT45 Rev. 0, May 1978.

Each peripheral subsystem sends a unique request for interrupt signal to the central processor subsystem which makes the highest priority peripheral subsystem operative in the display system. The number of peripheral subsystems in the display system is limited to the throughput capability of the central processor subsystem. The interrupt and priority apparatus in the display system can readily process interrupts from the maximum number of peripheral subsystems.

However present day display systems having higher speed microprocessors in the central processor subsystem, with subsequent increased throughput capabilities, can process many more peripheral subsystems than can prior art display systems. The interrupt and priority apparatus of the prior art display systems, when required to process an increased number of peripheral subsystems, is costly and relatively slow so as to reduce the overall display system throughput.

OBJECTS OF THE INVENTION

It is accordingly a primary object of the invention to provide an improved operation of a cathode ray tube display system.

It is another object of the invention to provide a cathode ray tube display at a reduced cost.

It is still another object of the invention to provide a cathode ray tube system with an improved interrupt system.

It is still another object of the invention to provide an interrupt system with an improved priority network.

SUMMARY OF THE INVENTION

The above and other objects of the invention are accomplished in a preferred embodiment of the invention. A central processor subsystem, a memory subsystem and a plurality of peripheral subsystems are all connected in common to a system bus. Apparatus in the central processor subsystem receives interrupt signals from the other subsystems and on a predetermined priority basis selects an interrupting subsystem by generating address signals which are transferred via the system bus to the memory subsystem. In the preferred embodiment, the address signals identify a firmware routine, not a part of the invention, in Read Only Memory, to process the selected peripheral subsystem.

The interrupt signal from a subsystem is applied to an encoder 4-40, FIG. 6a, as are other interrupt signals from other subsystems. The encoder 4-40 signals a CPU 4-2 of an interrupt request and generates a 3-bit address code. The CPU 4-2 generates a predetermined address, in the preferred embodiment, hexadecimal FFF8, and sends the address out on the system bus. The address is received by the interrupt apparatus which generates an IRQACK acknowledge signal which is applied to enable a decoder 4-42. If the interrupt was generated by the keyboard, cathode ray tube display or communication subsystem as determined by the decoder 4-42 output, then the above three address bits are sent out on the address bus as hexadecimal FFFX, an even address.

If the interrupt was generated by an external communications option device 24 or a peripheral option 14 *a-f,* then an acknowledge signal is received by the option requesting the interrupt. The option sends the low order bits out on the address bus where they are combined with the high order address bits, hexadecimal FF, to generate the hexadecimal address FFXX, an even address.

On the next CPU cycle, the CPU 4-2 generates the address hexadecimal FFF9. In this case the interrupting subsystem generates FFFY or FFYY which is an old address, i.e., the even address above, incremented by one.

The novel features which are believed to be characteristic of the invention, both as to its organization and method of operation, together with further objects and advantages will be better understood from the following description when considered in connection with the accompanying drawings. It is to be expressly understood, however, that each of the drawings is given for the purpose of illustration and description only and are not intended as a definition of the limits of the present invention.

DESCRIPTION OF THE PREFERRED EMBODIMENT

Figure 1:
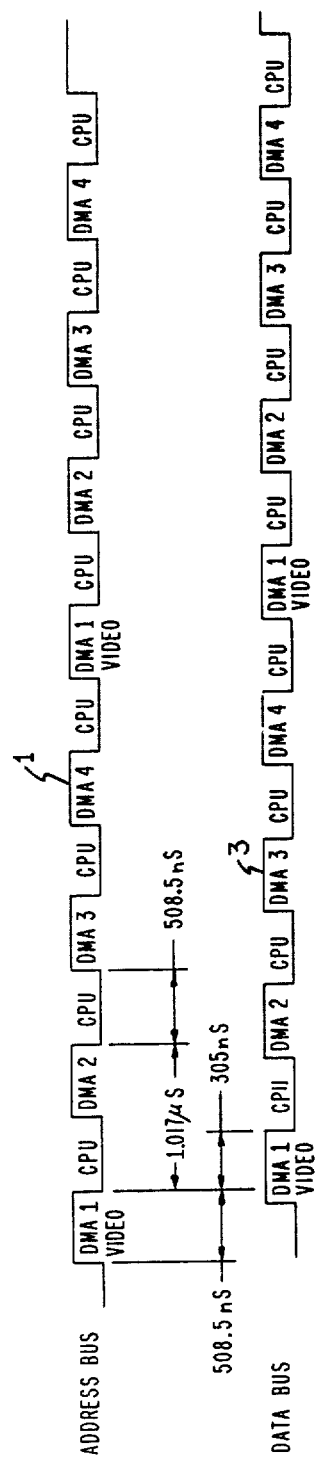
FIG. 1 shows the system bus cycle timings of the preferred embodiment.

In the preferred embodiment shown in FIG. 1, the system bus timing is divided into an address phase 1 and a data phase 3 with the data phase 3 lagging the address phase 1 by typically 305 nanoseconds. Both the DMA and CPU cycles are typically 508.5 nanoseconds long. Successive CPU cycles are 1.017 microseconds apart.

Figure 2:
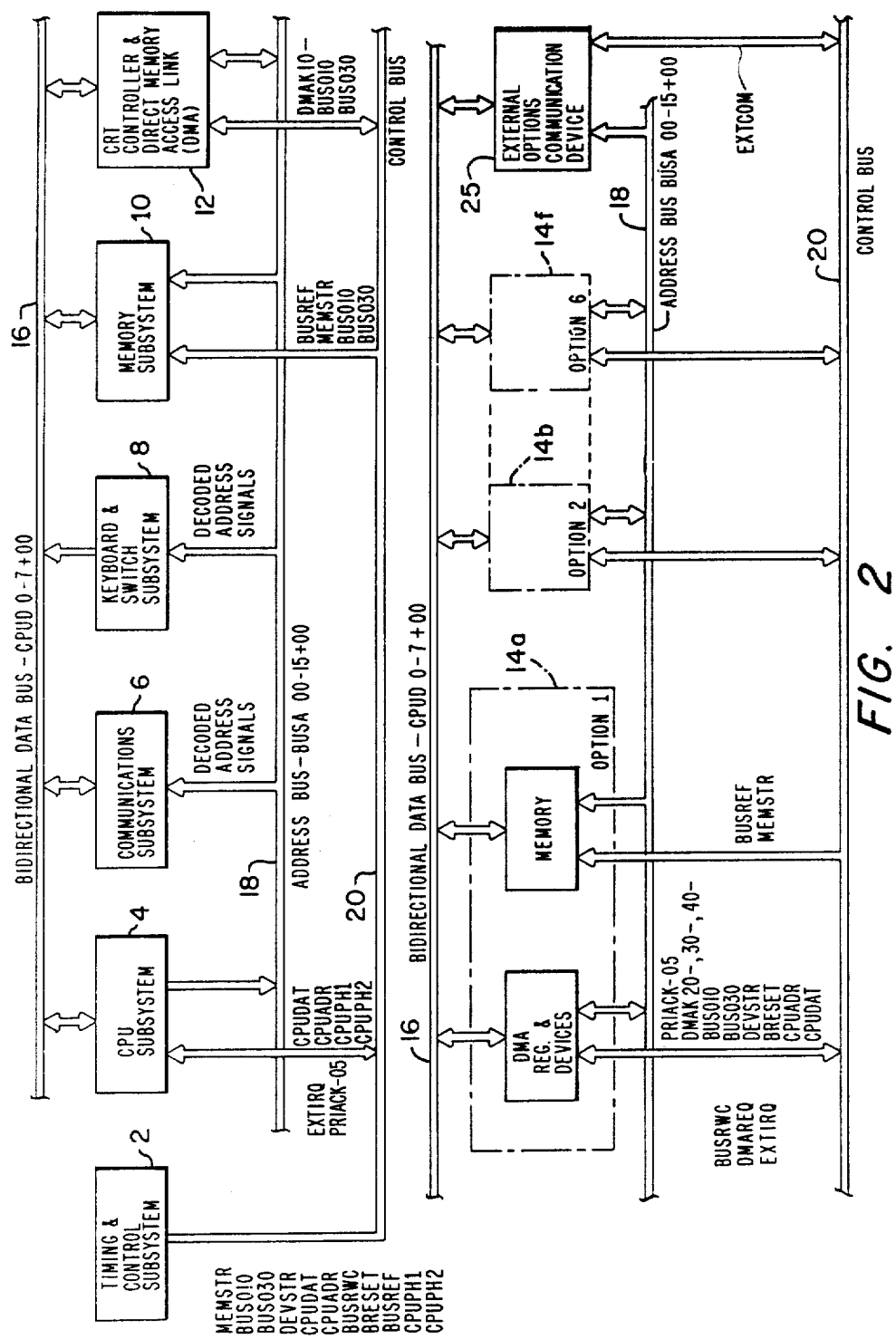
FIG. 2 is an overall block diagram of the system.

A central processor 4 of FIG. 2 is operative during CPU cycles. Peripheral subsystems 14 a-f are preassigned to be operative during DMA cycles. The cathode ray tube subsystem 12 is exclusively preassigned to be operative during DMA1 cycles since the CRT display requires continuous updating from memory subsystem 10.

FIG. 2 shows the overall system comprising a timing and control subsystem 2, the central processor unit (CPU) subsystem 4, a keyboard and switch subsystem 8, the memory subsystem 10, the CRT controller and direct memory access (DMA) link 12, an external communications device option 25 and a number of optional peripheral devices typically 14 a-f connected to a bidirectional data bus 16, an address bus 18 and a control bus 20.

The timing and control system 2 generates the cycle timing for the address bus 18 and the data bus 16 as shown in FIG. 1 for address phase 1 and data phase 3, and for the control bus 20.

The memory subsystem 10 comprises 8,192 word locations of random access memory (RAM) and 20,480 word locations of read only memory (ROM). The ROM stores microprogram subroutines that control overall system operation. Sections of RAM are set aside as registers, buffers and word areas. The memory subsystem 10 is operative during both CPU and DMA bus cycles. Memory address locations identified by signals BUSA00−15+00 are received over address bus 18 and during a memory read cycle a data word CPUD0−7+00 is sent out over data bus 16. During a memory write cycle the data word CPUD0−7+00 is received over data bus 16.

The signal lines BUSA00−15 identify each of the 16 address lines of address bus 18. BUSA00−15+ indicates that a signal line is at a binary ONE when the signal on the line is high. BUSA00−15+00 identifies the address signals BUSA00−15+ as being on the 00 bus.

The CPU subsystem 4 is operative with data bus 16 and address bus 18 during CPU cycle time to read from or write to the memory subsystem 10 or a peripheral device 14 a-f. The CPU subsystem 4 controls overall system operation by means of the microprogram subroutines stored in the memory subsystem 10 ROM. The CPU subsystem 4 receives microwords over signal lines CPUD0−7+00 on data bus 16 in response to address signals BUSA00−15+00 sent out on address bus 18 by CPU subsystem 4. The CPU subsystem 4 may also read or update RAM areas of memory subsystem 10 at the address location identified by the BUSA00−15+00 signal sent from the CPU subsystem 4 over address bus 18.

The microprogram subroutines are not a part of the invention. They will be described only as necessary to understand the operation of the overall system.

The keyboard and switch subsystem 8 inputs information in the form of data words or control codes onto the data bus 16 during CPU cycle time. This information was initiated as a result of manual operation of a keyboard or the manual operation of switches or investigative routines of the CPU subsystem 4 and is processed by microprogram control by the CPU subsystem 4.

The communications subsystem 6 is operative during CPU cycle time. It operates in synchronous or asynchronous mode and can transmit or receive information. Host systems may be connected to the communications subsystems 6. Therefore, all information on data bus 16 during CPU cycle time passes through the communications subsystem 6 under microprogram control in the event the information is to be transmitted to the host system.

The CRT controller and direct memory access (DMA) link 12 is operative during DMA1 cycles, FIG. 1. Successive memory address locations identified by signals BUSA00−15+00 are sent to memory 10 over the address bus 18 from the CRT controller and DMA link 12 for each displayed line. Control information and data characters for display are sent from memory 10 over data bus 16 to the CRT controller and DMA link 12.

A number of options such as buffered printers, diskettes, extended memory, HDLC communications are connected to the system as options 14 a-f. The options 14 a-f are operative to communicate with memory subsystem 10 during DMA 2-4 cycle time. Each option 14 a-f is internally wired to a particular DMA 2, 3 or 4 cycle time.

Certain BUSA00−15+00 signals address areas in RAM of memory subsystem 10. These areas are set aside as registers. These addresses are decoded as signal lines and are sent to individual subsystems over address bus 18 to indicate to the subsystem that a particular register in memory 10 is being accessed. These signals are not pertinent in the understanding of the invention but are described in detail where necessary to understand the operation.

The timing and control subsystem generates and receives control signals over a control bus 20. Those signals are described below.

CPUADR−00: CPU Address Control

This signal defines the DMA and the CPU bus cycle timing of address bus 18. When the signal is low the CPU address lines are gated to the address bus 18 and when high, the DMA address lines are gated to the address bus 18.

CPUDAT−00: CPU Data Control

This signal defines the DMA and the CPU bus cycle timings. When the signal is low the CPU controls the direction and purpose of the data bus 18. When the signal is high, the DMA devices control the data bus 18.

BUSRWC+00: Bus Read Write Control

This signal defines the type of data transfer on the data bus 16. It is valid during the CPUADR time for that phase of the bus cycle.

During the CPU phase, the signal at a logical ONE indicates that data is to be read from a device such as communications subsystem 6 or memory subsystem 10 to the CPU subsystem 4 over data bus 16. The signal at a logical ZERO indicates that data is to be written from the CPU subsystem 4 to the device or memory subsystem over data bus 16.

During the DMA phase, the signal at logical ONE indicates that data is to be read from memory subsystem 10 and sent to a DMA option device 14 a-f over data bus 16. The signal at logical ZERO indicates that data is to be sent to the memory subsystem 10 over data bus 16 from the DMA device 14 a-f.

MEMSTR−00: Memory Strobe

This signal provides internal timing pulses for memory subsystems during CPU and DMA bus cycles.

DEVSTR−00: Device Start

This signal is used by the optional devices 14 a-f as a clock pulse.

BUS010−00: Bus Strobe 1

This signal is used by the optional devices 14 a-f as a clock pulse.

BUS030+: Bus Strobe 3

This signal enables the memory subsystem 10 output during a read operation when at a logical ONE during CPU and DMA bus cycles. The signal is also available to options 14 a-f for timing.

BUS030−: Bus Strobe 3

This signal when at logical ZERO during DMA bus cycles activates the CRT controller and DMA link 12 write operation.

DMAREQ: DMA Request

There are 4 DMA request signal lines. DMAREQ+01 is assigned to the CRT controller and DMA link 12. Signal lines DMAREQ−02, DMAREQ−03 and DMAREQ−04 are available to specific options 14 a-f. As shown in FIG. 1, there are 4 DMA bus cycle time slots DMA1, DMA2, DMA3 and DMA4. A subsystem requests its assigned DMA bus cycle by forcing its DMAREQ signal to logical ZERO.

DMAKXO−: DMA Acknowledge

Four DMA acknowledge signals DMAK10−, DMAK20−, DMAK30− and DMAK40− define their respective time slots on the control bus by being forced to a logical ZERO.

EXTIRQ−00: External Interrupt Request

This signal when at a logical ZERO indicates that an option 14 a-f is interrupting and is requesting service of the CPU subsystem 4.

PRIACK−05: External Interrupt Acknowledge

This signal when at logical ZERO acknowledges the External Interrupt Request.

BRESET−00: Bus Reset

This signal is used by the CPU subsystem 4 to clear registers and reset flops throughput the system. It is operative when at logical ZERO.

BUSREF+00: Bus Refresh Line

This signal when at logical ONE initiates a memory refresh cycle. It is active for 1 DMA1 cycle every 16 microseconds.

Figure 3A:
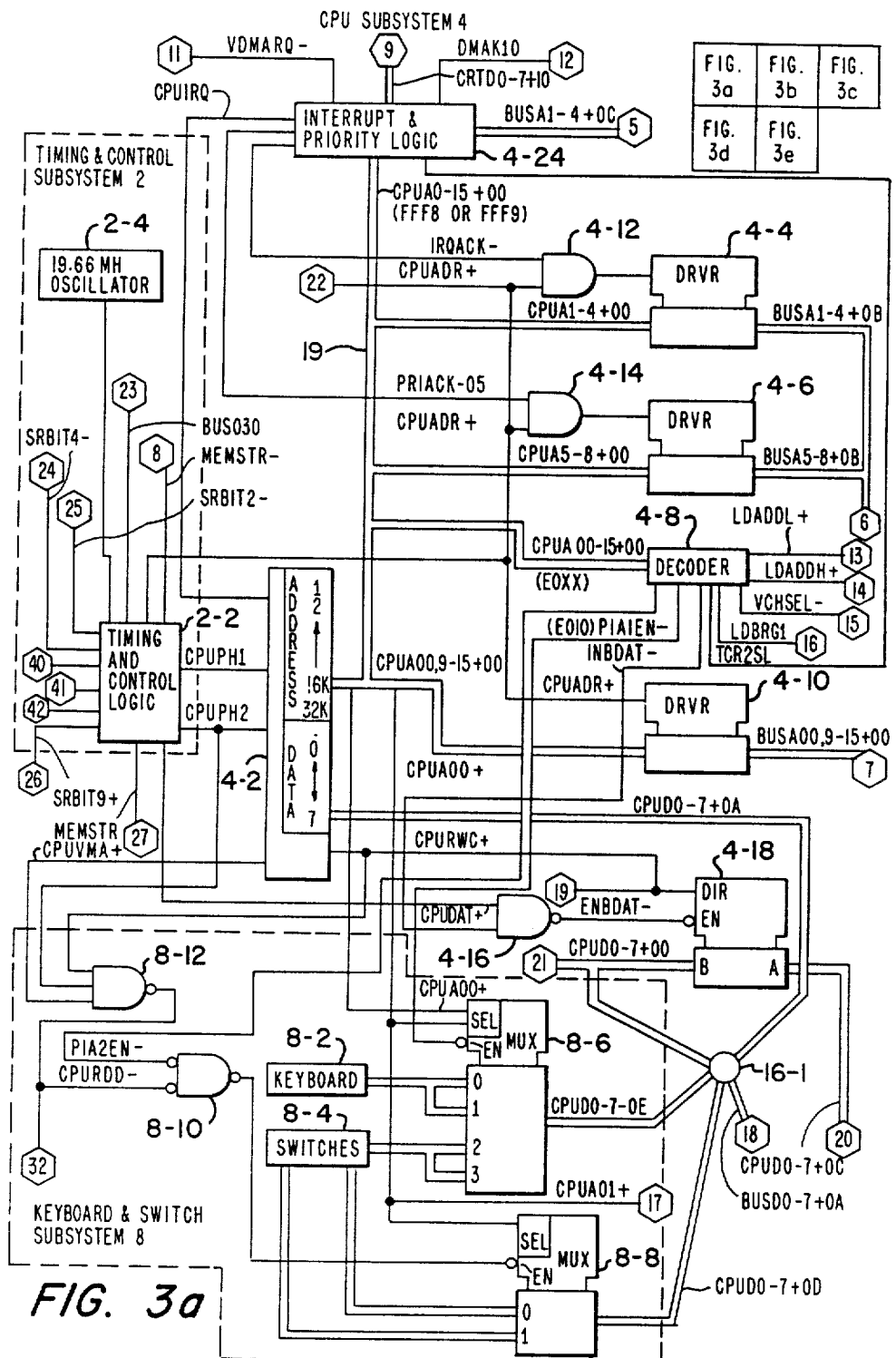
FIGS. 3a-e is a block diagram of the system showing the address bus and data bus signal lines.

FIG. 3 is a detailed block diagram of the system and is organized as FIGS. 3a-3e. The subsystems of FIG. 2 are shown separately on FIGS. 3a-3e. Referring to FIG. 3a, the timing and control subsystem 2 comprises an oscillator 2-4 and timing and control logic 2-2. The oscillator provides a square wave signal to the timing and control logic 2-2 which in the preferred embodiment is 19.66 megahertz. The timing and control logic 2-2 provides the logic signals which control the address bus 18, the data bus 16 and the control bus 20 signal timings.

Timing and control logic 2-2 generates 2 timing signals, CPUPH1 and CPUPH2, which control the timing of a microprocessor (CPU) 4-2. CPU 4-2 is a Motorola MC68A00 microprocessor described in "Specification DS9471" dated 1978, published by Motorola Semiconductors, 3501 Ed Bluestein Blvd., Austin, Texas, 78721.

The CPU subsystem 4 comprises the microprocessor 4-2 which generates address signals CPUA00−15+00 and generates and receives data signals CPUD0−7−+0A. The address signals CPUA1−4+00 are applied to a driver 4-4 which is enabled by an output signal of a NAND gate 4-12. The address signals CPUA5−8+00 are applied to a driver 4-6 which is enabled by an output signal of an AND gate 4-14. The address signals CPUA00,9−15+00 input a driver 4-10 which is enabled by control bus 20 signal CPUADR+ which is generated in timing and control logic 2-2. Address signals CPUA0−15+00 input interrupt and priority logic 4-24 if the CPU 4-2 address is in the hexadecimal form FFF8 or FFF9. These address locations are modified in interrupt 4-24 to identify the subsystem requesting an interrupt of the CPU subsystem 4. Address signals CPUA00−15+00 if in the hexadecimal form of memory locations EOXX are applied to decoder 4-8. Address EOXX defines a register in the memory subsystem 10.

Logic signal CPUADR+ is applied to AND gates 4-12 and 4-14. Logic signal IRQACK−, another input to AND 4-12, is low when the CPU 4-2 responds to an interrupt by sending address FFF8 or FFF9 to interrupt and priority logic 4-24. This suppresses the output of driver 4-4 signals BUSA1−4+0B and enables the interrupt 4-24 output signals BUSA1−4+0C onto the address bus 18. Logic signal PRIACK−05, another input to AND 4-14 is low during an external device interrupt, that is when the control bus 20 signal EXTIRQ−00 is low. This suppresses the output of drivers 4-4 and 4-6, address signals BUSA1−8+0B from appearing on address bus 18. The external device option 14 a-f, FIG. 3c, inputs signals BUSA1−8+00 from the address bus 18. The output of driver 4-10 signals BUSA00,9−15+0B appears on address bus 18 when logic signal CPUADR+ is high. Signal CPUADR+ provides the timing for the address output signals of CPU 4-2 onto address bus 18.

Data signals CPUD0−7+0A connect between CPU 4-2 and junction 16-1 on data bus 16 which connects to the B input of a transceiver 4-18. Logic signal CPURWC+ connects between the CPU 4-2 and the direction (DIR) input of the transceiver 4-18. When signal CPURWC+ is high, data is applied to the CPU 4-2. When signal CPURWC+ is low, then data is received from the CPU 4-2. Logic signals CPUDAT+ and INBDAT− input a NAND gate 4-16 whose output, logic signal ENBDAT− inputs the enable terminal of transceiver 4-18. Logic signal INBDAT− is an output of decoder 4-8 and enables the transceiver 4-18 when the CPU 4-2 is addressing a register in memory 10 associated with the CRT controller and DMA link 12.

Figure 3B:
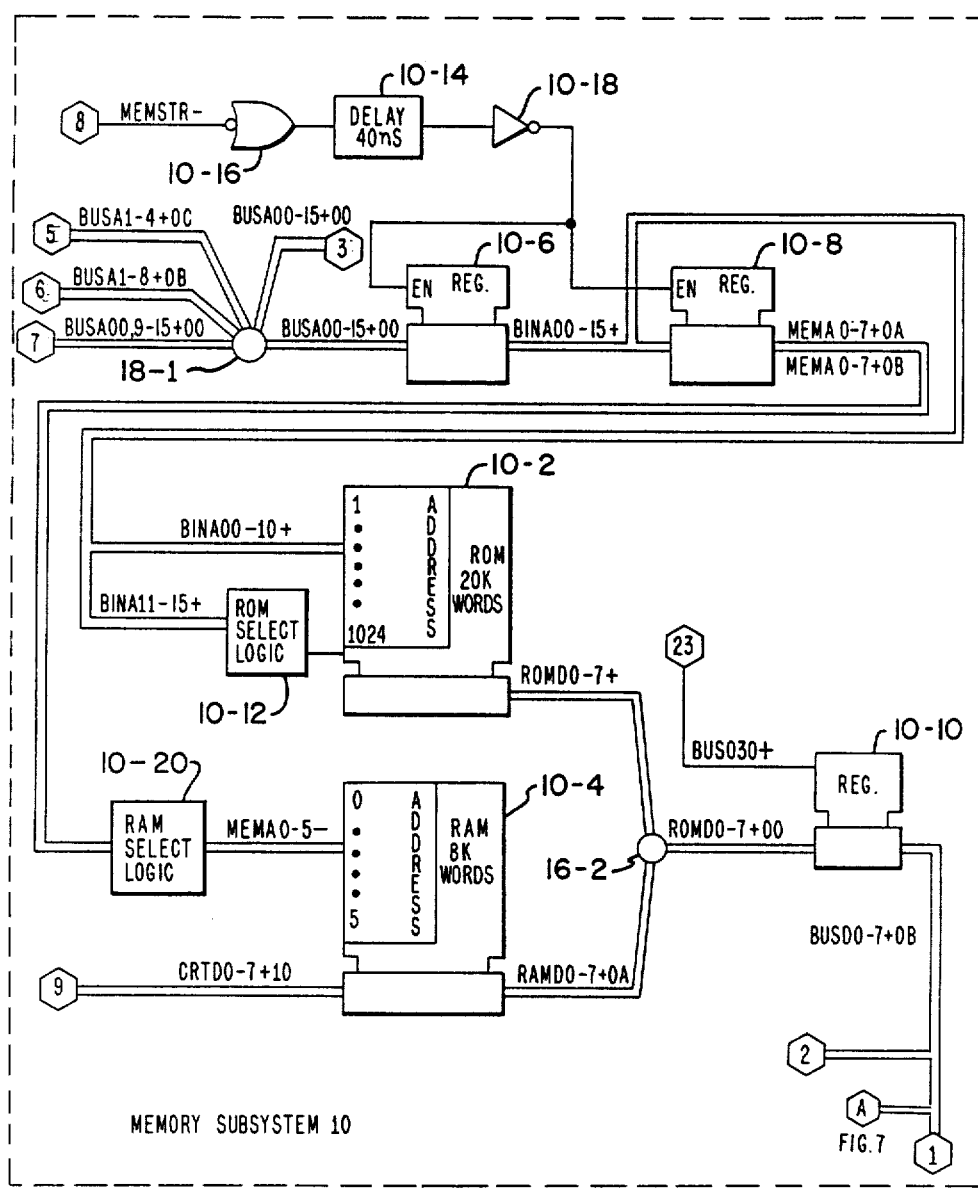

The memory subsystem 10, FIG. 3b, comprises 20 K words of read only memory (ROM) 10-2 and 8 K words of random access memory (RAM) 10-4. ROM 10-2 is made up of ten 2716 circuits described in the Intel Data Catalog, 1977, published by Intel Corporation, 3065 Bowers Ave., Santa Clara, CA 95051. Each ROM 10-2 circuit stores 8 bits in each of 2048 address locations. RAM 10-4 is made up of sixteen 2104A circuits described in the above Intel Data Catalog. Each RAM 10-4 circuit stores 1 bit in each of 4096 address locations.

Address bus 18 signals BUSA00−15+00 input a register 10-6 whose output signals BINA00−15+ input a register 10-8. The output signals BINA00−10+ input the ROM 10-2 address terminals and BINA11−15+ input a ROM select logic 10-12. ROM select logic 10-12 selects 1 of 10 ROM 10-2 memory chips. Signal BINA00−10+ selects 1 of 2048 address locations in the selected ROM 10-2 memory chip.

The register 10-8 output signals MEM0−7+0A are applied to RAM select logic 10-20 on a first cycle and output signals MEMA0−7+0B are applied to RAM select logic 10-20 on a second cycle. The RAM select logic 10-20 output signals MEM0-5− are applied to RAM 10-4 to select 1 of 4096 address locations. The first and second cycle selection logic is not shown since it is not pertinent to the understanding of the invention. Registers 10-6 and 10-8 are enabled by the following logic circuit. Control bus 20, signal MEMSTR-, inputs a NOR 10-16 whose output is delayed 40 nanoseconds by a delay line 10-14, inverted by an inverter 10-18 and inputs the enable terminal of registers 10-6 and 10-8.

The output of ROM 10-2 and RAM 10-4, data signals ROMD0−7+ and RAMD0−7+0A are applied through a junction 16-2 to a register 10-10, which is enabled for the time the bus enable signal BUS30+ is high. The output of register 10-10, data signal BUSD0−7+0B is applied through a junction 16-3, FIG. 3d, to the B terminal of a transceiver 12-14 and the A terminal of a transceiver 4-18, FIG. 3a. Transceiver 4-18 connects the memory 10 data output to data bus 16 for connection to CPU 4-2. Transceiver 12-4 connects the data output of memory 10, data signals BUSD0−7+0B to CRT controller and DMA link 12.

The keyboard and switch subsystem 8, FIG. 3a, comprises a keyboard 8-2, a plurality of switches 8-4, a multiplexer 8-6 and a multiplexer 8-8. The keyboard 8-2 and switches 8-4 connect to inputs of MUX 8-6 and 8-8. The output of the MUX's data signals CPUD0−7+0D and CPUD0−7+0E connect to junction 16-1 of data bus 16. The MUX 8-6 is enabled by a decoded address signal PIA1EN− which is generated by decoder 4-8.

MUX 8-8 is enabled by the output of NAND 8-10 whose inputs are signals PIA2EN− generated by decoder 4-8 and CPURDD−, an output of CPU 4-2. Under control of CPU 4-2 an address signal CPUA00−15+00 in the form of hexadecimal address E010 received by decoder 4-8 results in logic signal PIA1EN− being forced low to enable MUX 8-6. In a similar manner hexadecimal address E020 causes logic signal PIA2EN− to be forced low in the decoder 4-8 thereby enabling MUX 8-8, when a logic signal CPURDD−, the read data signal, is forced low. Logic signal CPURDD− is generated by a NAND gate 8-12 from the input signals CPUVMA+ indicating a valid address on the address bus 18, the CPURWC+ indicating a write into CPU 4-2 operation and the CPUPH2 timing signal. Address line CPUA00+ inputs a SELECT terminal 1 of MUX 8-6 and address line CPUA01+ inputs a SELECT terminal 2 of MUX 8-6 and a SELECT terminal of MUX 8-8. These address signals select the keyboard and/or switch outputs for connection to junction 16-1 of data bus 16.

Figure 3C:
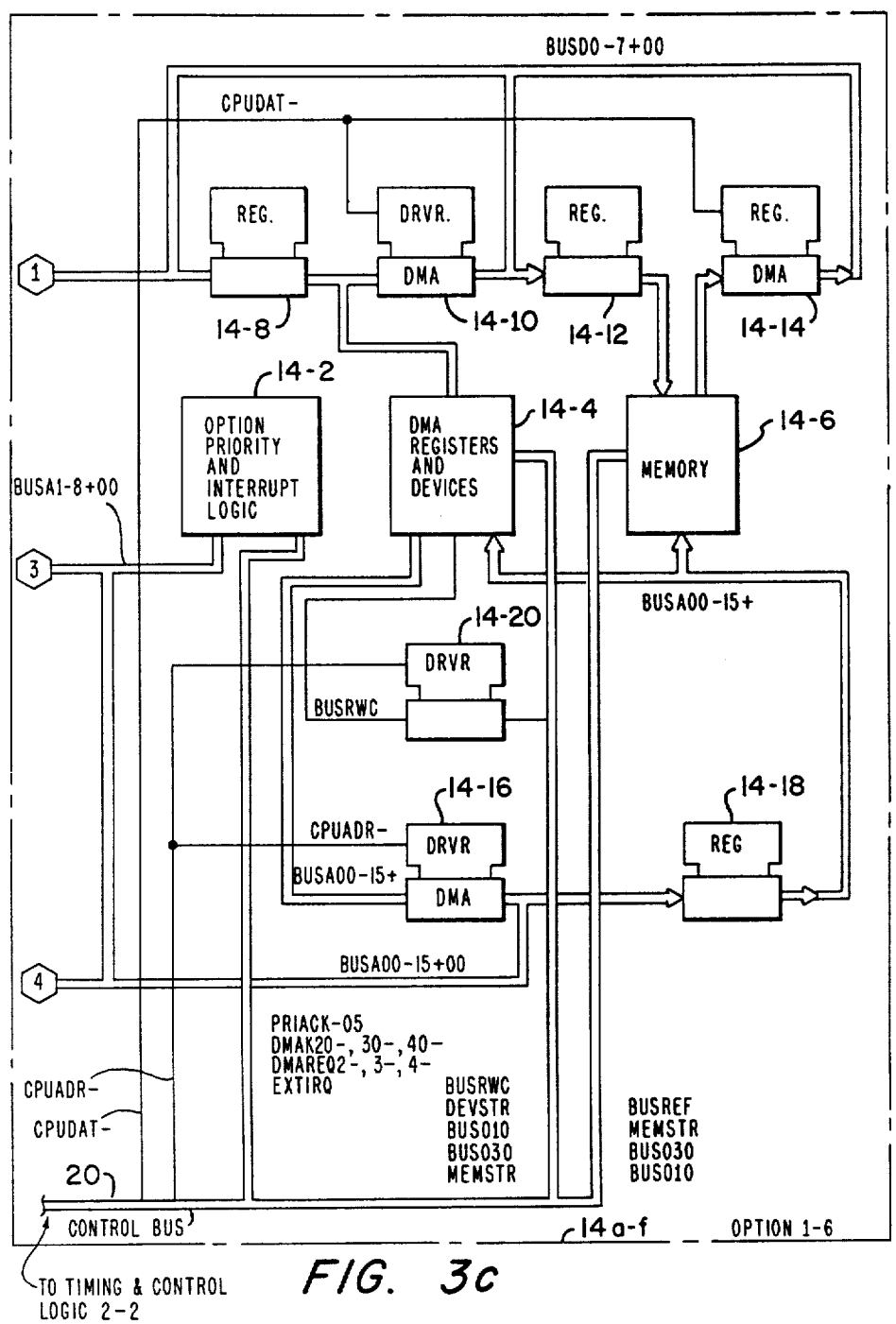
Figure 3D:
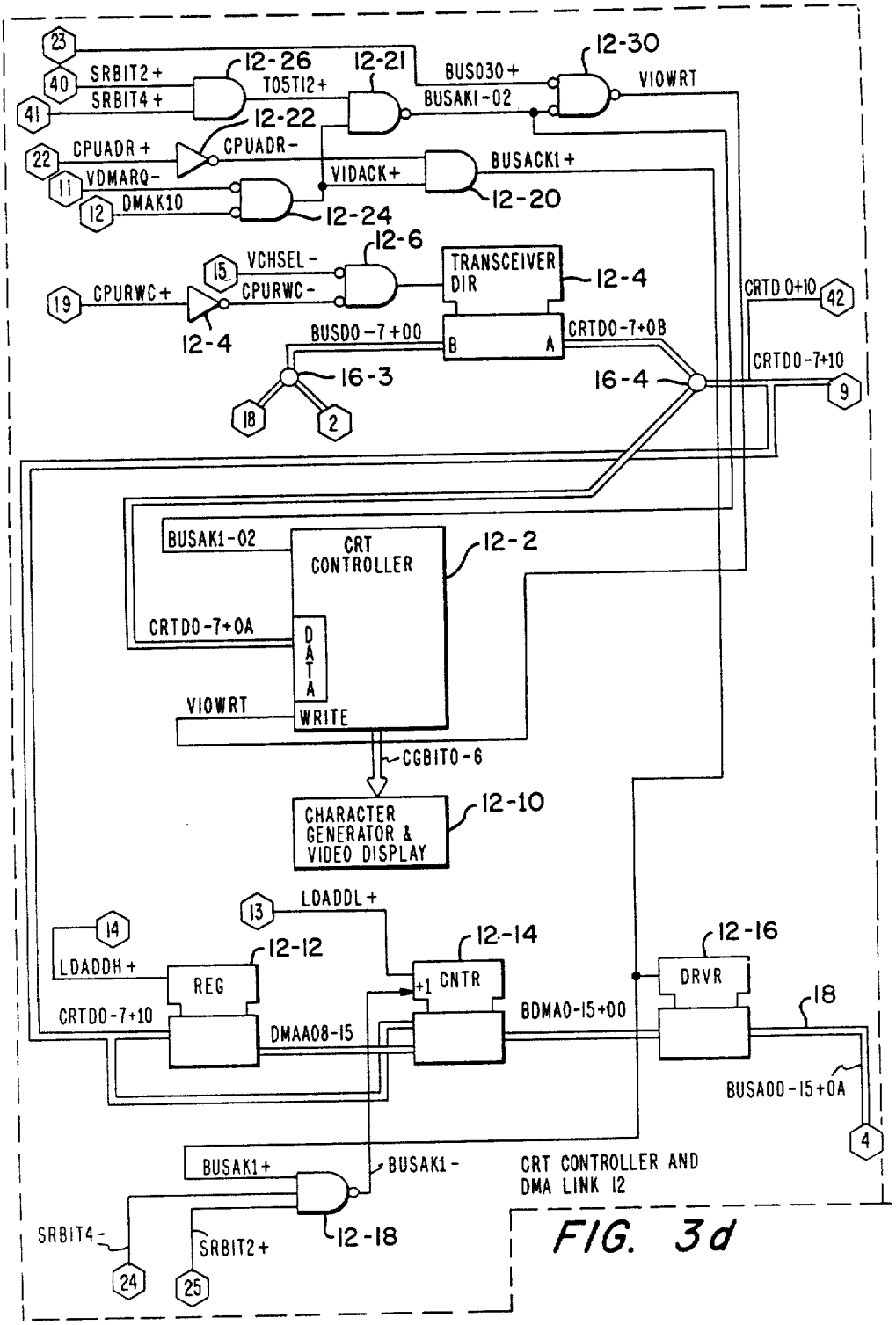
Figure 3E:
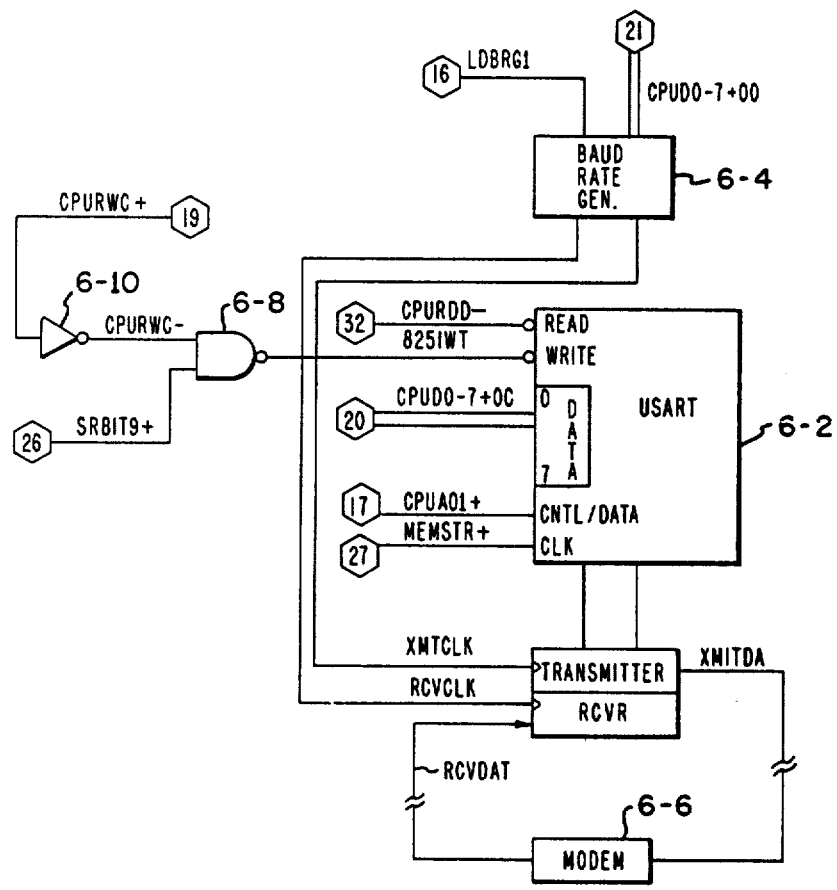

The communications subsystem 6, FIG. 3e, comprises a universal synchronous, asynchronous receiver transmitter (USART) 6-2, a baud rate generator 6-4 and an external device such as modem 6-6. The USART 6-2 is an 8251 communication interface described in the above Intel Data Catalog. The baud rate generator 6-4 provides the receive clock timing signal RCVCLK and the transmit clock timing signal XMTCLK for the USART 6-2. The baud rates are loaded into the baud rate generator 6-4 under CPU 4-2 control. CPU 4-2 sends out a hexadecimal address E030 on address bus 18 which is decoded in decoder 4-8, as the LDBRG1 signal. CPU2 then sends encoded baud rate signals on the data bus 16 to the baud rate generator 6-4. These signals are used to clock data transmitters from the USART 6-2 to the modem 6-6 over signal line XMITDA or to clock data received from the modem 6-6 over signal line RCVDAT to the USART 6-2.

USART 6-2 is connected to the data bus 16 by signals CPUD0−7+00. When addressing USART 6-2, CPU 4-2 address signal CPUA01+ is high, control information is on the data bus 16. The address signal CPUA01+ low indicates that data information is on the data bus 16. The USART 6-2 reads information from the data bus 16 when logic signal CPURDD, the output of NAND 9-12, is 102. The USART 6-2 writes information on the data bus 16 when logic signal 8251WT, the output of a NAND gate 6-8 is low, the inputs to NAND 6-8 are signals CPURWC− from an inverter 6-10 and SRBIT9+, a timing pulse from timing and control loigc 2-2. The MEMSTR+ timing strobe, output of timing and control logic 2-2, FIG. 3a, gates the data signals CPUD0−7+0C into the USART 6-2.

In FIG. 3d, the CRT controller and DMA link 12 comprises a CRT controller 12-2, a character generator and video display 12-10, an address counter 12-14, a register 12-12, a driver 12-16 and a transceiver 12-4. The counter 12-14 is loaded by the CPU 4-2 which sends out hexadecimal addresses E031 and E032 on address bus 18. This forces logic signal LDADDH+, the output of decoder 4-8, high enabling register 12-12. Address location E031 of ROM 10-2, FIG. 3b, stores the 8 high order bits of the starting RAM 10-4 address for the video display character. These high order bits are read out of ROM 10-2, through register 10-10, transceiver 12-4, FIG. 3d, and are stored in register 12-12 as signals CRTD0−7+10. The CRTD0+10 signal indicates to the timing and control logic 2-2 to initiate a system reset operation when the decoder 4-8 generates a TCRST− signal. This logic is shown in FIG. 4b. On the next CPU bus cycle, CPU 4-2 sends out address location E032 of ROM 10-2, and the 8 low order bits are read from ROM 10-2 through register 10-10, transceiver 12-4 into counter 12-14. The output of register 12-12 signals DMA08-15 are also stored in counter 12-14, since the enable signal LDADDL is high. The character generator and video display 12-10 are activated each DMA1 cycle. The output of counter 12-14, memory address BDMA0−15+00 appears on address bus 18 through a driver 12-16, junction 18-1, FIG. 3b, register 10-6, register 10-8, RAM 10-4. Data output signals RAMD0−7−+0A input register 10-10, junction 16-3, FIG. 3d, transceiver 12-4, junction 16-4 to CRT controller 12-2 as data signal CRTD0−7+0A and to the character generator and video display 12-10 as signals CGBIT0−6. Signal BUSAK1−, the output of a NAND gate 12-18 advances the counter 12-14 to indicate the next RAM 10-4 address location. The timing signals SRBIT4− and SRBIT2+ from timing and control logic 2-2, FIG. 3a, input NAND 12-18 as does the bus acknowledge signal BUSAK1 which outputs an AND gate 12-20. The interrupt and priority logic 4-24 outputs a video request signal VDMARQ− and a DMAK10 signal which assigns the DMA1 bus cycle timing of FIG. 1. These signals input a NAND gate 12-24 whose output VIDACK+ inputs the AND gate 12-20. The other input to AND 12-20 is a CPUADR− signal which is the output of an inverter 12-22 whose input is the control bus 20 timing signal CPUADR+.

Counter 12-14 counts on the rising edge of signal BUSAK1−. Timing signal CPUADR− goes high to start a DMA cycle. Logic signal DMAK10− goes low for the duration of the DMA1 cycle. If the CRT controller and DMA link 12 requests a DMA cycle, request signal DVMARQ− goes low forcing the signal VIDACK+ output of NAND gate 12-24 high. This forces the signal BUSACK1+ output of AND gate 12-20 high since timing signal CPUADR− is high. The BUSACK1+ signal output of AND 12-20 gates the output of driver 12-16, address signals BUSA00−15+0A to be timed to the DMA1 address bus cycle since the CPUADR− timing signal defines the DMA address bus 18 timing.

Logic signal BUSAK1−, the output of NAND gate 12-18 is normally high. It is forced low at the beginning of the DMA1 address bus 18 cycle when timing signals SRBIT2+ and SRBIT4−, FIG. 4, are high. Logic signal BUSAK1− is forced high when timing signal SRBIT4− goes low thereby incrementing the address stored in counter 12-14.

Up to six options 14 a–f may connect to the data bus 16, address bus 18 and control bus 20. Each option may contain an option priority and interrupt logic 14-2, a DMA register and devices 14-4 and a memory 14-6. Option priority and interrupt logic 14-2 connects to signal lines BUSA01−08+00 of address bus 18 and to signal lines PRIACK−05, DMAREQ2 through DMAREQ4 and EXIRQ of control bus 20. Options are wired to signal lines DMAK20−, DMAK30− or DMAK40− to be operative on DMA2, DMA3 or DMA4 bus cycles respectively.

DMA registers and devices 14-4, FIG. 3c, connect to address bus 18 through a register 14-18 and to data bus 16 through a driver 14-10 and a register 14-8. Control signal BUSRWC connects to the control bus 20 through driver 14-20 to indicate to memory 10 if the peripheral of options 14 a–f will read from or write into memory 10. DMA registers and devices 14-4 also connect directly to control bus 20. Memory 14-6 connects to the address bus 18 through register 14-18, connects to the data bus through a register 14-12 and a register 14-14 and connects directly to control bus 20.

Driver 14-10 and register 14-14 are enabled during DMA cycles by control signal CPUDAT−. Drivers 14-16 and 14-20 are enabled during DMA cycles by control signals CPUADR−. The appropriate DMA registers and devices 14-4 and memory 14-6 of their respective options 14 a–f are connected to the data bus 16, address bus 18 and control bus 20 under control of their respective option priority and interrupt logic 14-2 operating in conjunction with interrupt and priority logic 4-24. The relationship between the peripheral options 14 a–f, the data bus 16 and the address bus 18 are disclosed in the related application.

Specific options are wired to be operable on a specific one of the available DMA2−DMA4 cycles, FIG. 1. The options interrupt the CPU by forcing control bus 20 signal EXTIRQ− low thereby signalling interrupt and priority logic 4-24 that an option 14 a–f requests service from the CPU 4-2. The options 14 a–f forces the DMAREQ 2-4 request signal assigned to the particular option low to indicate to other options wired to be operative on a particular DMA cycle that the option requested the bus.

The options are not described in detail since a complete understanding of their operation is not necessary for the understanding of the invention but are described only as necessary for someone skilled in the art to understand the complete environment in which the invention operates. A description of the control signals was described previously.

Figure 4A:
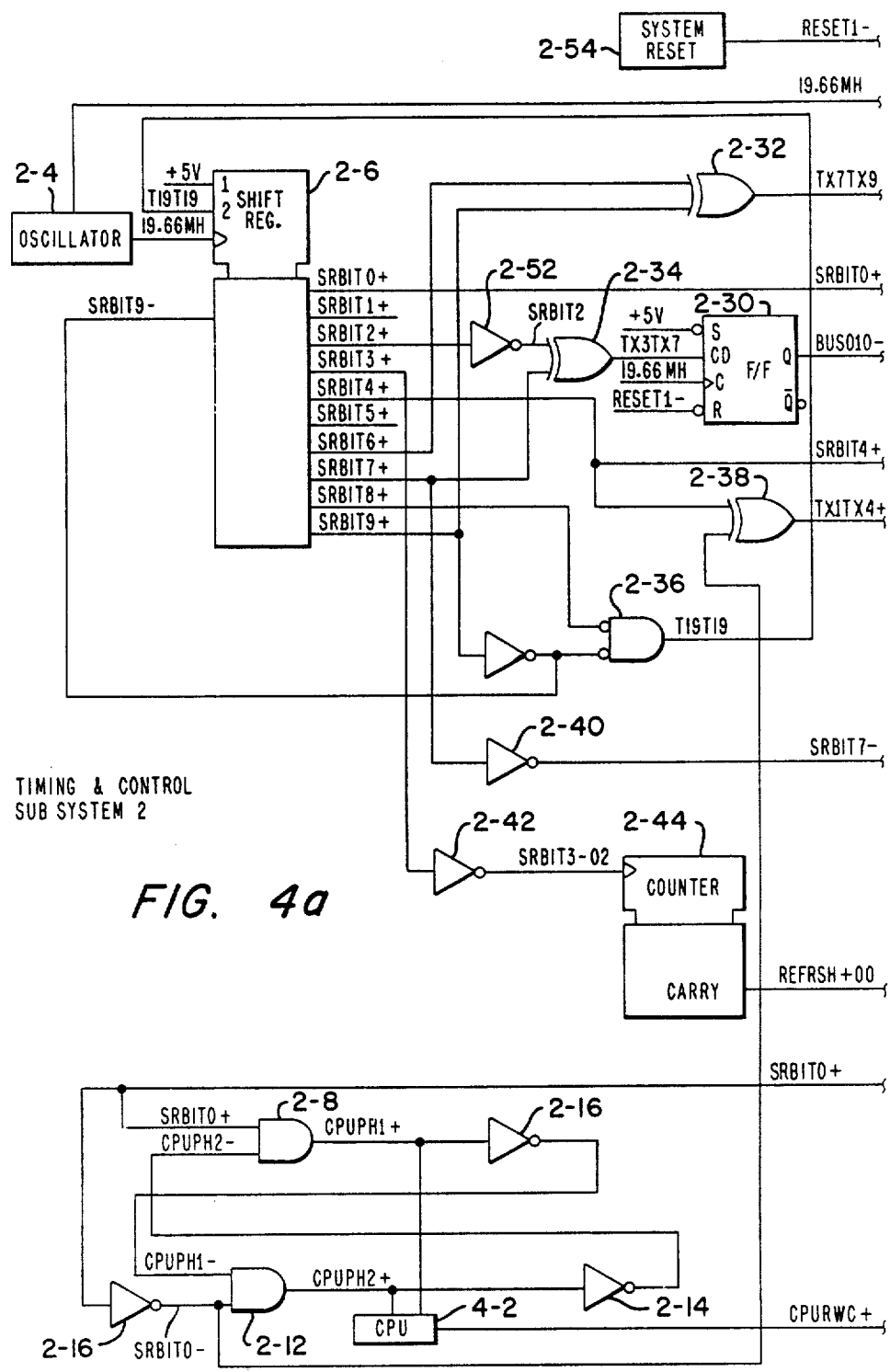
FIGS. 4a and 4b are logic diagrams of the timing and control unit.
Figure 4B:
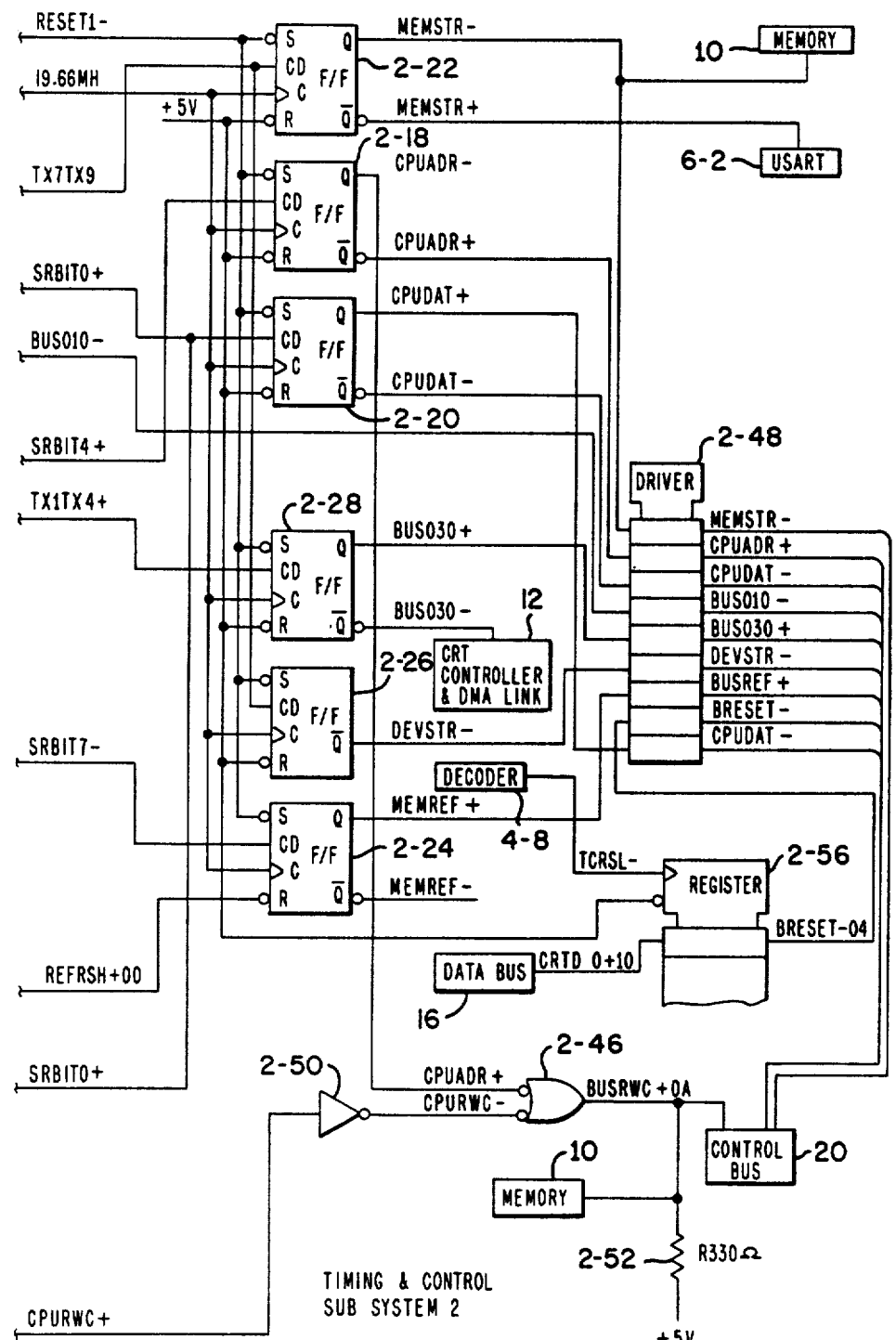
Figure 5:
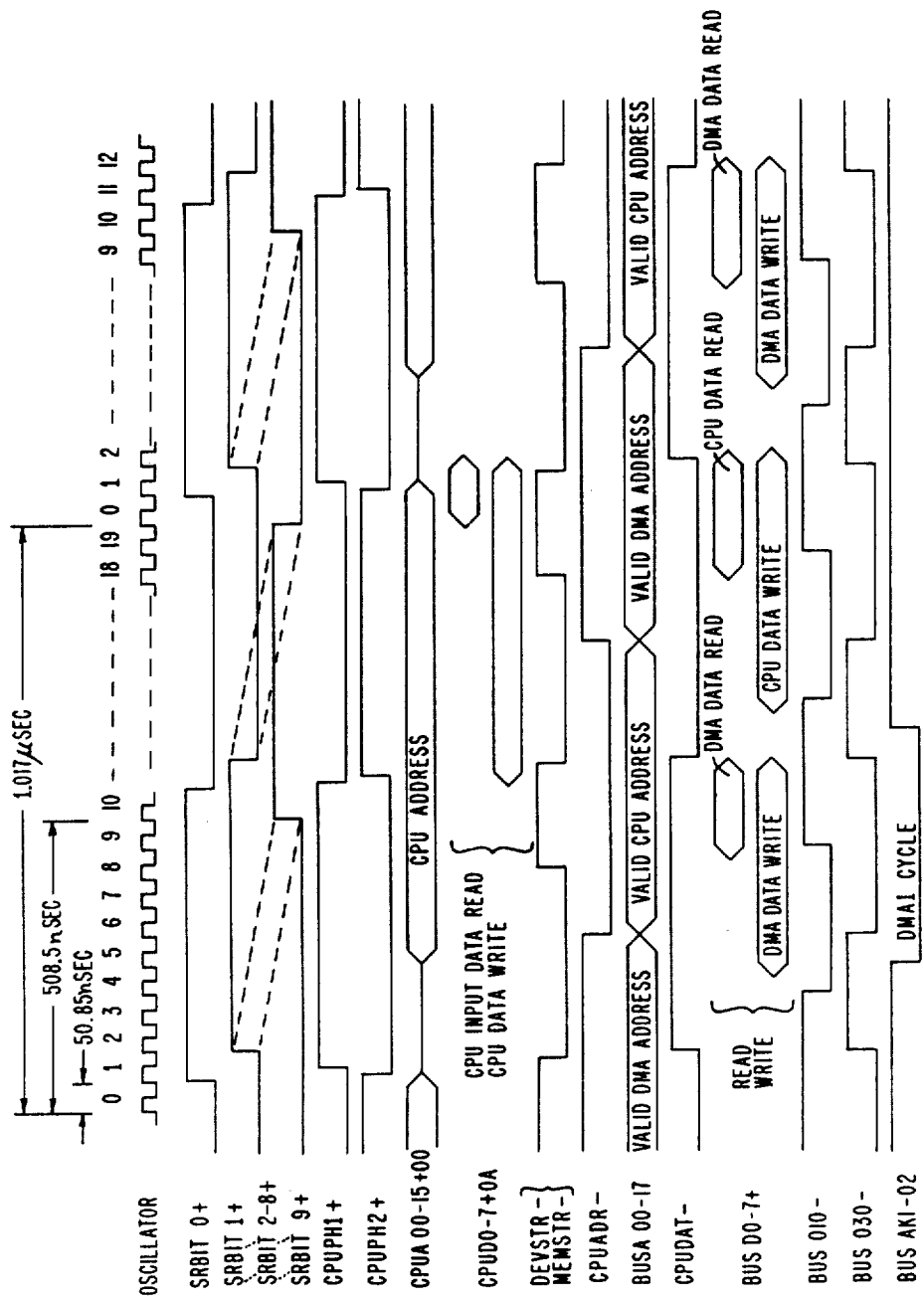
FIG. 5 is a timing diagram of the system bus signals.

FIGS. 4a,b show the detailed logic of the timing and control logic 2 which generates the address bus 18, data bus 16 and control bus 20 timings. FIG. 5 is a timing diagram of the pertinent signals.

The oscillator 2-4 output signal is shown in FIG. 5. Each oscillator cycle of the preferred embodiment is 50.85 nanoseconds. This value is chosen to be compatible with the baud rate generator 6-4, FIG. 3. The invention described herein, however, is not limited to this value of oscillator cycle timing.

Twenty oscillator output cycles of 1.017 microseconds define 1 CPU and 1 DMA cycle and are identified in FIG. 5 as time slots 0 through 19.

In FIG. 4a, the oscillator 2-4, 19.66 megahertz output is applied to the clock terminal of a shifter register 2-6. The shifter register 2-6 output, timing signals SRBIT0+ through SRBIT9+, are shown in FIG. 5.

Signal CPUPH1+ and CPUPH2+ are used as clock timing signals for the CPU 2-4. An AND gate 2-8 output signal CPUPH1+ is high when timing signal SRBIT0+ is high and signal CPUPH2− is high. When timing signal SRBIT0+ goes low during time slot 10 of FIG. 5, the output of AND 2-8, signal CPUPH1+ goes low. An inverter 2-10 output signal CPUPH1− goes high as does an inverter 2-16 output signal SRBIT0−. Since both inputs to an AND gate 2-12 are high, the output signal CPUPH2 goes high. When signal SRBIT0− goes low, the output signal CPUPH2 of AND 2-12 goes low forcing the output of an inverter 2-14 high again forcing the output signal of AND 2-8, CPUPH1 high. CPU 2-4 timing signals CPUPH1 and CPUPH2 continue to cycle as shown in FIG. 5.

Timing signals CPUADR+ and CPUADR−, the output of a flop 2-18, generate the address bus 18 timing through control of drivers 4-4, 4-6, 4-10, FIG. 3a, 12-16, FIG. 3d, 14-16 and 14-20, of FIG. 3c. The oscillator 2-4 output signal is connected to the CLOCK input of flop 2-18 and the SRBIT4+ timing signal is connected to the CD input. The flop 2-18 sets on the next rise of the oscillator 2-4 output signal following the rise of the SRBIT4+ timing signal. Flop 2-18 resets on the next rise of the oscillator 2-4 output signal following the fall of the SRBIT4+ timing signal.

FIG. 5 shows the address output signals CPUA00−15+ of the CPU 2-4 which were generated using the CPUPH1+ and CPUPH2+ timing signals, the CPUADR− signal which gates the CPUA00−15+00 address signals and the address bus 18 signals BUSA00−17 which shows the valid CPU address.

FIG. 5 also shows the valid DMA address BUSA00−17 when the CPUADR− timing signal is high. This valid DMA address is the gated output of driver 12-16, FIG. 3d, and also the gated output drivers 14-16 and 14-20 of options 14 a-f, FIG. 3e.

A flop 2-20 generates the data bus 16 timing signals CPUDAT− and CPUDAT+. Flop 2-20 sets on the rise of the oscillator 2-4 clock following the clock cycle in which timing signal SRBIT0+ goes high and resets on the rise of the oscillator 2-4 clock following the clock cycle in which timing signal SRBIT0+ goes low. FIG. 5 shows the CPUDAT− signal defining the DMA data cycle when high and the CPU data cycle when low. The transceiver 4-18, FIG. 3a, controls the data bus 16 timing during the CPU cycle through control of the ENABLE terminal by the ENBDAT+ output of NAND 4-16 which is conditioned by the timing signal CPUDAT+. The CPUDAT− signal provides the DMA cycle timing for the data bus 16 by controlling the outputs of register 14-14, FIG. 3c, and driver 14-10 by signal CPUDAT− and by controlling the WRITE input to CRT controller 12-2, FIG. 3d. The BUSAK1−02 output signal of a NAND 12-28 is low during the DMA1 cycle, FIG. 5. The output of a NAND 12-30 signal VIOWRT− is low when logic signal BUS0 30− is low thereby defining the DMA data bus 16 cycle time for the DMA1 video display cycle from cycle 6 time through cycle 11 time, FIG. 5.

Timing signals SRBIT2+ and SRBIT4+ input an AND gate 12-26, FIG. 3a, whose output signal T05T12+ inputs NAND 12-28 thereby generating the BUSAKI−02 output signal.

The memory strobe signal MEMSTR− is generated by a flop 2-22. Timing signals SRBIT6+ and SRBIT9+ input an EXCLUSIVE OR gate 2-32, FIG. 4a, whose output signal TX7TX9 is connected to the CD terminal of flop 2-22, FIG. 4b. The flop sets on the rise of the oscillator 2-4 clock following the cycle in which the TX7TX9 timing signal goes high and resets on the rise of the oscillator 2-4 clock following the cycle in which TX7TX9 timing signal goes low. Signal MEMSTR− in FIG. 5 shows the timing of the flop 2-22. The MEMSTR− signal connects to the output control terminal of register 10-10, FIG. 3b, and controls the timing of the data signals BUSD0−7+0B. In FIG. 5, the BUSD0−7+ DMA DATA READ and CPU DATA READ signals show this timing. DMA DATA READ is responsive to a VALID DMA ADDRESS and CPU DATA READ is reponsive to a VALID CPU ADDRESS. The MEMSTR+ output signal of flop 2-22, FIG. 4b, is a timing signal for USART 6-2, FIG. 3e.

A flop 2-28, FIG. 4b, generates the BUS030 timing signals. Timing signals SRBIT0− and SRBIT4+ input an EXCLUSIVE OR 2-38 whose output signal TX1TX4 is connected to the CD terminal of flop 2-28. Flop 2-28 is set at cycle time 5, the cycle after signal SR4+ goes high, BUS030− timing, FIG. 5, and reset at cycle time 11, the cycle after signal SRBIT0+ goes low. As described above, signal BUS030− defines the DMA1 data bus 16 cycle during a CRT controller 12-2 write cycle. Signal BUS030+ also controls the memory system 10 output data duration on the data bus 16 during a memory read operation by controlling the output of register 10-10, FIG. 3b. Signal BUS030+ performs similar timing functions in memory 14-6 and DMA registers and devices 14-4 of options 14 a-f, FIG. 3c.

A flop 2-26 generates the device strobe signal DEVSTR− for use in options 14 a-f. It is set and reset with the same timings as the MEMSTR flop 2-22 and times the options 14 a-f to the address bus 16 and the data bus 18.

A flop 2-24 establishes the timing for refreshing memory 10 and memory 14-6 in options 14 a-f through the BUSREF+ signal.

A flop 2-30, FIG. 4a, generates the BUS010− timing signal for options 14 a-f. SRBIT2− and SRBIT7+ input EXCLUSIVE OR 2-34 whose output signal TX3TX7 connects to the CD terminal of flop 2-30. Flop 2-30 resets on the cycle after the rise of the SRBIT2+ signal and sets on the cycle after the next rise of the SRBIT7+ signal. The timing signal SRBIT2− is generated by an inverter 2-52 inverting the SRBIT2+ signal.

The bus write control signal BUSRWC+ output of a NOR 2-46 is generated from the CPURWC+ and signal from CPU 4-2. Signal CPURWC+ is inverted by an inverter 2-50 whose output signal CPURWC− inputs NOR 2-46. Signal CPUADR+ inputs the other terminal of NOR 2-46. During a CPU bus cycle, signal CPUADR+ is high, therefore the output signal BUSRWC is controlled by the CPURWC− signal which is low when information is read from memory 10 to the CPU 4-2 thereby forcing the control bus 20 BUSRWC+ signal high. When the CPUADR+ signal is low indicating a DMA cycle then the output of NOR 2-46 is high. In this case the options 14 a-f generate the BUSRWC+ signal on control bus 20 which is forced low when data is to be written into memory 10 from an option 14 a-f device. A 330 ohm resistor 2-52 holds the BUSRWC+ signal line high when an option 14 a-f device has an inactive DMA cycle.

A system reset 2-54, FIG. 4a, generates a RESET− signal for resetting all flops in timing and control subsystem 2. In addition, the CPU 4-2 can clear all registers in the options 14 a-f devices by sending an address to the decoder 4-8 which generates a TCRSL− signal to enable a register 2-56 which stores the data bus 16 signal CRTD00+10 and outputs it as signal BRESET-0A which inputs a driver 2-48. The driver 2-48 sends the aforementioned control signals out on control bus 20.

The interrupt and priority logic 4-24 receives interrupt requests from the various subsystems coupled to the bus. A fixed priority is established by the interrupt and priority logic 4-24.

Figure 6A:
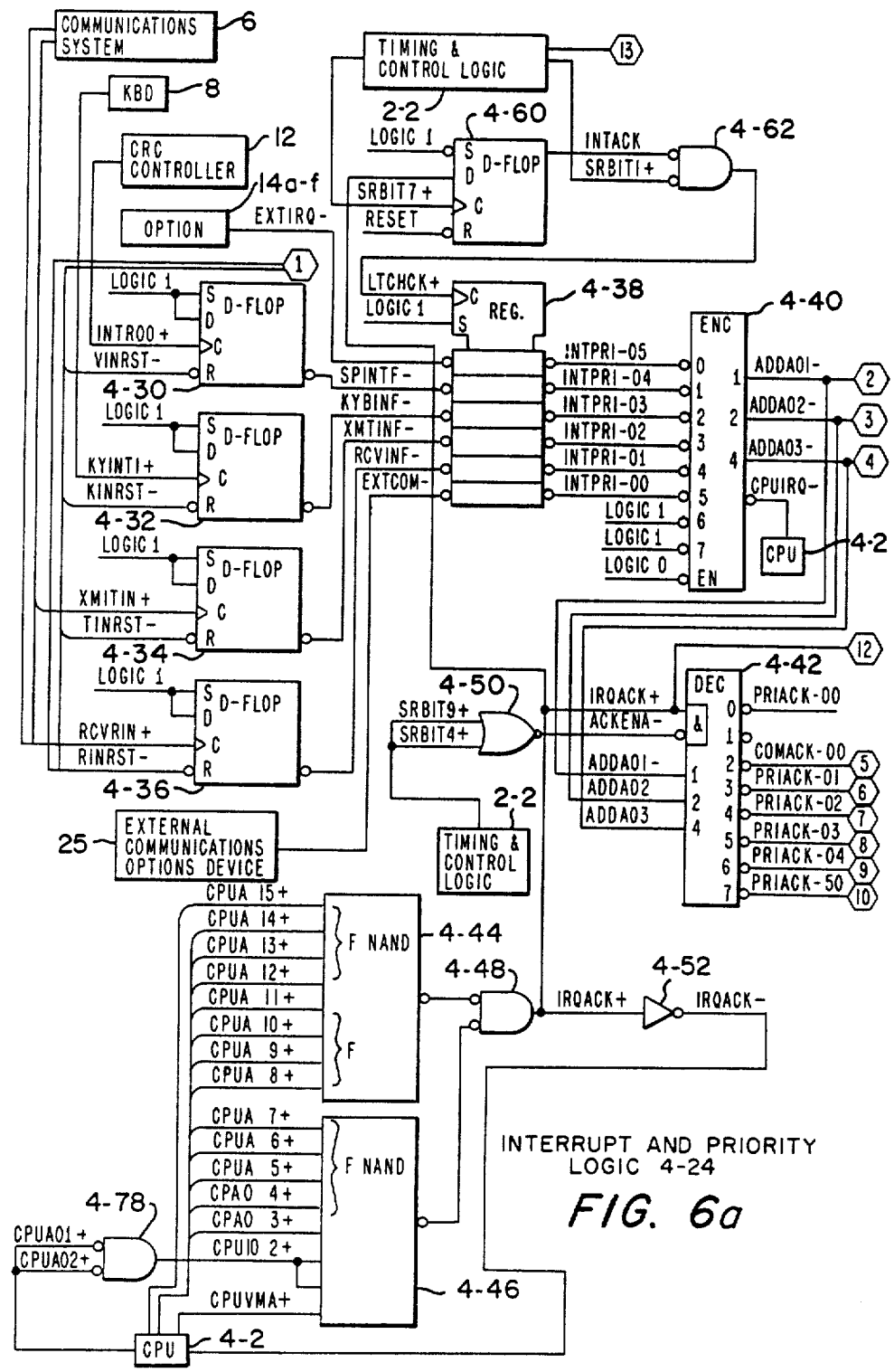
FIGS. 6a and 6b are logic diagrams of the central processor unit interrupt system.

Referring to FIG. 6a, the highest priority subsystem, a communication option, signal EXTCOM− is applied to an input of a register 4-38. An output signal INTPR1−00 is applied to input terminal 5 of an encoder 4-40.

The receive data operation of the communications 6 subsystem has the next highest priority and the transmit data operation has the third highest priority. For the receive operation a signal RCVINF− is applied to an input of register 4-38. An output signal INTPR1−01 is applied to input terminal 4 of encoder 4-40. For the transmit operation a signal XMTINF− is applied to an input of register 4-38. An output signal INTPR1−02 is applied to input terminal 3 of encoder 4-40.

The keyboard 8 subsystem has the fourth highest priority. A signal KYBINF− is applied to an input of register 4-38. A signal INTPR1−03 is applied to input terminal 2 of encoder 4-40.

The CRT 12 subsystem has the fifth highest priority. A signal SPINTF− signal is applied to an input of register 4-38. An output signal INTPR1−04 is applied to input terminal 1 of encoder 4-40.

The peripheral options 14 a-f have the lowest priority. A signal EXTIRQ− is applied to an input of register 4-38. An output signal INTPR1−05 is applied to input terminal 0 of encoder 4-40.

The encoder 4-40 is a 74148 8-line to 3-line priority encoder. The encoded output signals are operative for the highest priority input signal to the encoder 4-40.

A CPUIRQ− output signal from encoder 4-40 is applied to the input terminal of CPU 4-2, FIG. 3a. This signal, at logical ZERO, allows the CPU 4-2 to complete the current instruction and if properly conditioned, the CPU 4-2 goes into an interrupt mode. The CPU 4-2 forces the CPU address bus 19 signals CPUA00−15+00 to hexadecimal FFF8 on the first CPU cycle and hexadecimal FFF9 on the second CPU cycle.

The CPUA8+ to CPU15+ signals input to a NAND gate 4-44 are at logical ONE when hexadecimal FFXX is on the address bus 18. Similarly, when hexadecimal signals XXF8 or XXF9 are on the address bus 18, and a CPU 4-2 signal CPUVMA+ is at logical ONE indicating a valid address, the inputs to a NAND gate 4-46 are at logical ONE. The CPUA01+ and CPU02+ signals at logical ZERO are applied to the input of a NAND gate 4-78. The output signal CPU102 applied to NAND gate 4-46 is at logical ONE. Both inputs to a NAND gate 4-48 at logical ZERO forces the output signal IRQACK+ to logical ONE thereby indicating that CPU 4-2 has acknowledged the interrupt.

The output signals ADDA01−, ADDA02− and ADDA03− which are coded to indicate the subsystem requesting the interrupt are applied to the inputs of a decoder 4-42 and through inverters 4-54, 4-56 and 4-58 to the inputs of a driver 4-64 as signals ADDA01+, ADDA02+ and ADDA03+.

Signal IRQACK+ is applied to an enable AND input of decoder 4-42, and to an input of a NAND gate 4-66. Signal ACKENA, the output of a timing NOR gate 4-50, is at logical ZERO when timing signals SRBIT4+ and SRBIT9+ are at logical ONE. Signal CPUADR+0A is applied to an input of NAND gate 4-66 and indicates a CPU bus cycle when at logical ONE.

If the subsystem requesting an interrupt is from an internal subsystem then the output signals COMACK−00 and PRIACK−50 which are at logical ONE are applied to the inputs of an OR gate 4-68. The output signal PRIACK−05 at logical ONE is applied to another input of NAND gate 4-66. The output signal MYVECT− at logical ZERO enables a driver 4-64 and puts out on the address bus 18 signals BUSA01+0C through BUSA04+0C, which indicates to the system the subsystem which is interrupting. As described supra, hexadecimal FFFX on the address bus 18 is the starting address of an interrupt service routine which the microprocessor will execute. D flops 4-30, 4-32, 4-34 and 4-36 are set by interrupt request signals INTR00+, KYINT1+, XMITIN+ and RCVRIN+ respectively from the CRT 12 subsystem, the keyboard 8 subsystem and the communications 6 subsystem.

The flops 4-30 through 4-36 are masked out or prevented from setting under control of CPU 4-2 which generates signals CRTD02−05+10 over the data bus 16 which are applied to a register 4-80. The CPU 4-2 also puts an address out on the address bus 18 which is decoded in decoder 4-8, FIG. 3a, as signal TCR2SL which enables register 4-80. The output signals VIDINT+, KYSINT+, XMTINT+ and RCVINT+ are applied to inputs of OR gates 4-76, 4-74, 4-72 and 4-70 respectively. When these signals are at logical ZERO, the outputs of OR gates 4-70 through 4-76 are at logical ZERO, preventing flops 4-30 through 4-36 from being set since the reset input terminals are at logic ZERO.

The flops are normally reset when one of the output signals, PRIACK−01 through PRIACK−04, of decoder 4-42 is forced to logical ZERO, thereby forcing the respective output of OR gate 4-70 through 4-76 to logical ZERO thereby resetting the respective flop 4-30 through 4-36.

When the CPU 4-2 acknowledges an interrupt, a D flop 4-60 is set at SRBIT7+ time. When the output signal INTACK is at logical ONE the output of a NAND gate 4-62 is forced to logical ZERO thereby preventing other subsystems from interrupting until the completion of the interrupt being processed.

Figure 6B:
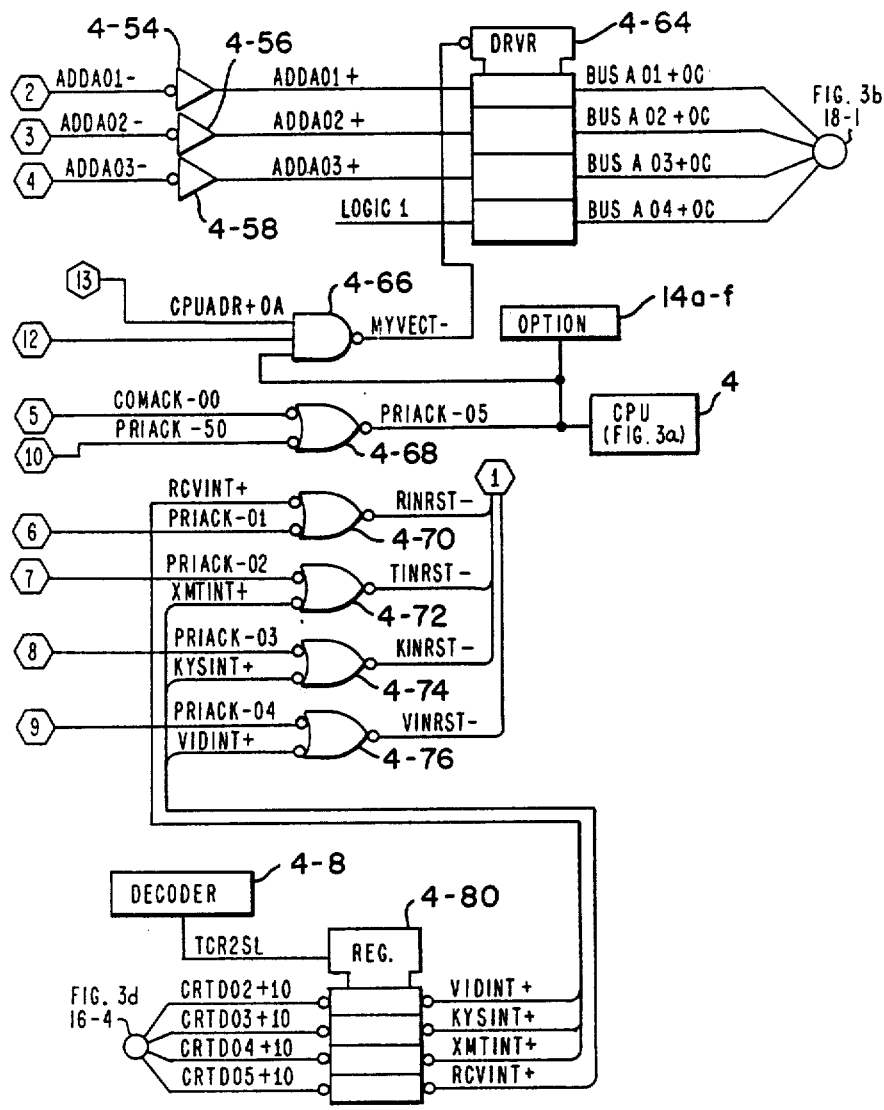

When the interrupt is from the peripheral option 14 a-f, the signal PRIACK−50 output of decoder 4-42 is forced to logical ZERO. This forces signal PRIACK−05, the output of OR gate 4-68 to logical ZERO. Now referring to FIG. 3a, the signal PRIACK−05 input to AND gate 4-14 at logical ZERO disables driver 4-6. Also, driver 4-4 is disabled by the logic signal IRQACK− at logical ZERO input to AND gate 4-12. Referring to FIG. 6b, the logic signal PRIACK−05 input to NAND gate 4-66 disables driver 4-64. The bus address signals BUSA01−08 are supplied by the interrupting option as described supra.

The signal COMACK−00 operates with the external communications options device 25 in a manner similar to the way PRIACK−50 operates with the peripheral options 14 a-f.

Referring to FIG. 6a, on the CPU cycle following the cycle on which the CPU 4-2 placed hexadecimal address FFF9 on the address bus 18, another address applied to the inputs of NAND gate 4-44 and 4-46 will force signal IRQACK+ to logical ZERO conditioning flop 4-60 to reset at SRBIT7+ time, thereby enabling register 4-38 at SRBIT1+ time to receive other interrupt signals.

Figure 7A:
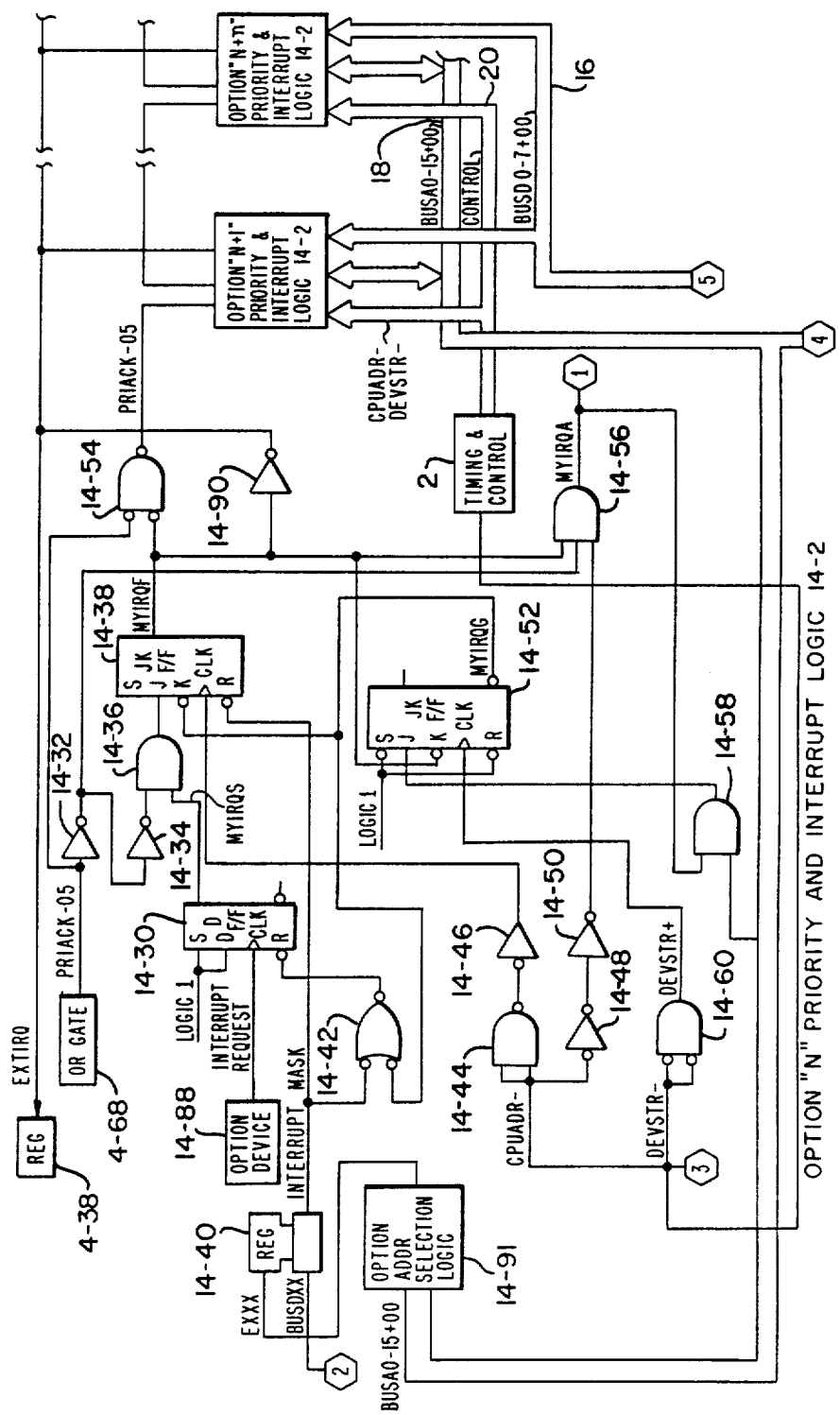
FIGS. 7a and 7b are logic diagrams of the option interrupt system.
Figure 7B:
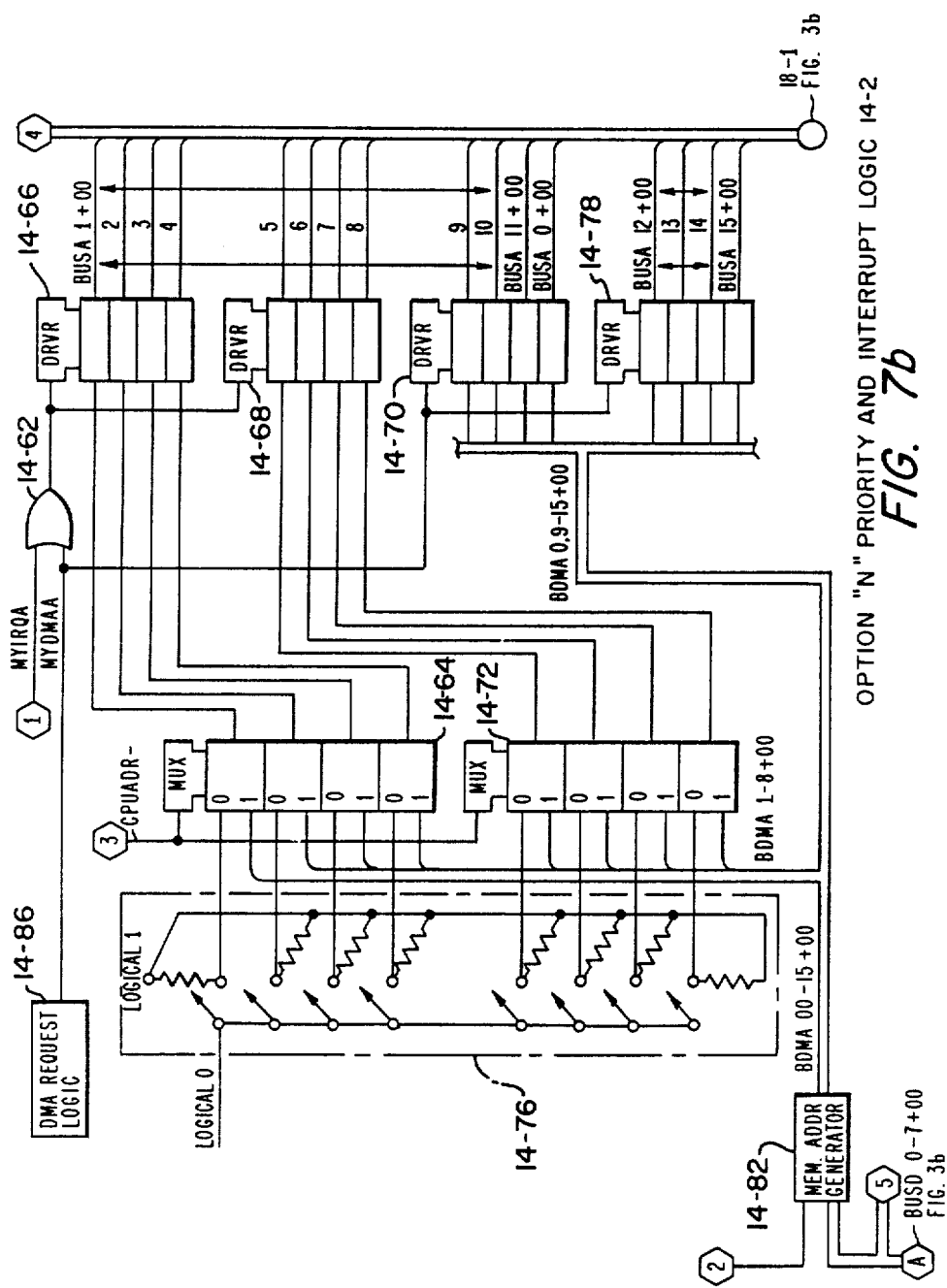

Referring to FIG. 7a, when the option device 14-88 requests an access to the bus the interrupt request signal line is forced to logical ONE thereby setting a D flop 14-30. Output signal MYIRQS at logical ONE is applied to the input of an AND gate 14-36. Since signal PRIACK-05 is at logical ONE when no option 14 a-f is interrupting, the other input of AND gate 14-36 is at logical ONE through inverters 14-32 and 14-34. The output signal of AND gate 14-36 is applied to the J terminal of a JK flop 14-38 which sets during the rise of the signal CPUADR— which is applied to the CLK terminal of flop 14-38 through a NAND gate 14-44 and an inverter 14-46.

The output signal MYIRQF is applied to the inputs of a NAND gate 14-54 and an inverter 14-90. The output of inverter 14-90 at logical ZERO forces signal EXTIRQ to logical ZERO thereby requesting an interrupt of the central processor 4-2 as described supra. The CPU 4-2 can prevent the option device 14-88 from interrupting by forcing the interrupt mask signal line to logical ZERO preventing flop 14-38 from setting. This is done by sending a predetermined address signal, hexadecimal EXXX, decoded from the address bus signals BUSA0−15+00 in option address selection logic 14-91 to enable a register 14-40 and applying a prewired signal BUSDXX over data bus 16 to register 14-40.

The signal EXTIRQ at logical ZERO is applied to the input of register 4-38 (FIG. 6a). Output signal INTPR1−05 at logical ZERO is applied to the terminal 0 of encoder 4-40. Output signal CPUIRQ− at logical ZERO is applied to the CPU 4-2. The CPU 4-2, when it completes its operation, sends out the hexadecimal address FFF8 on CPU address bus 19. These signals are applied to the inputs of NAND gates 4-44 and 4-46 and generate an acknowledge signal IRQACK+ which enables decoder 4-42. Address signals ADDA01−, ADDA02− and ADDA03− are all at logical ZERO forcing the output signal PRIACK−50 to logical ZERO. This forces the OR gate 4-68 output signal PRIACK−05 to logical ZERO.

Referring to FIG. 7a, the inputs to an AND gate 14-56 are at logical ONE. Signal PRIACK−05 is applied through inverter 14-32 to one input, signal CPUADR− is applied through inverters 14-48 and 14-50 to another input, and signal MYIRQF is applied to the other input of AND gate 14-56. The output signal MYIRQA at logical ONE is applied to the input on an OR gate 14-62 whose output enables drivers 14-66 and 14-68. A switch bank 14-76 is preset to provide a unique 8 address bits to identify the option device 14-88. These signals are applied to the input terminal 0 of MUXs 14-64 and 14-72. Control signal CPUADR− is applied to the select terminal of MUXs 14-64 and 14-72. Input terminal 0 is selected for the CPU cycle and input terminal 1 is selected for the DMA cycle.

Control signal DEVSTR− is applied to the input of a NAND gate 14-60. The output signal DEVSTR+ is applied to the clock terminal of flop 14-52, setting the flop on the rise of the DEVSTR+ signal. Output signal MYIRQG at logical ZERO is applied to the K terminal of flop 14-38, conditions the flop for resetting at the next rise of control signal CPUADR− thereby forcing the EXTIRQ signal high.

During the DMA cycle when the option is operative with the bus, a memory address generator 14-82 provides the memory 10 address, signals BDMA0−15+00. The operation of the generator 14-82 is similar to that of the counter 12-14, register 12-12 and driver 12-16 of FIG. 3d.

Signal BDMA0−15+00 is applied to input terminal 1 of MUXs 14-64 and 14-72. The output signals of MUXs 14-64 and 14-72 are applied to the input of drivers 14-66 and 14-68. Signals BDMA0,9−15+00 are applied to the inputs of driver 14-70 and 14-78. An OR gate output is applied to the enable terminals of drivers 14-66, 14-68, 14-70 and 14-78. Drivers 14-66 and 14-68 are enabled during the CPU cycle when signal MYIRQA is at logical ONE when the option sends BUSA1−8+00 signals to memory 10 which represent the lower order hexadecimal digits of the ROM 10-2 address of the firmware routine which process the interrupt.

Drivers 14-66, 14-68, 14-70 and 14-78 are enabled during the DMA cycle by signal MYDMAA at logical ONE when the option sends address signals BUSA0−15+00 to memory 10 during the transfer of data over data bus 16.

During the second CPU cycle that CPU 4-2 sends out hexadecimal address FFF9 on CPU address bus 19, signal BUSA0+ at logical ONE is applied to the input of an AND gate 14-58. Signal MYIRQA, at logical ONE, is applied to the other input of AND gate 14-58, the J terminal of a JK flop 14-52.

Signal EXTIRQ is applied to each of the priority and interrupt logic 14-2 of each of the options 14 a-f in the system. Any option requesting an interrupt pulls the signal EXTIRQ to logical ZERO by setting its respective flop 14-38. The interrupt and priority logic 4-24, FIG. 6b, responds by forcing signal PRIACK−05 to logical ZERO. Signal PRIACK−05 is wired through NAND gate 14-54, FIG. 7a, of each option priority and interrupt logic 14-2 of options 14 a-f in a "daisy chain" fashion. The priority of the options is established by the position of the option in the "daisy chain". Since signal PRIACK−05 is wired in series through the options, the first option to which signal PRIACK−05 is wired has top priority, the 5th option has fifth priority and so forth. Note that if PRIACK−05 at logical ZERO is applied to NAND gate 14-54 and flop 14-38 is set then the output of NAND gate 14-54 is at logical ONE, preventing options further down the daisy chain from responding to their respective interrupt acknowledge.

Figure 8:
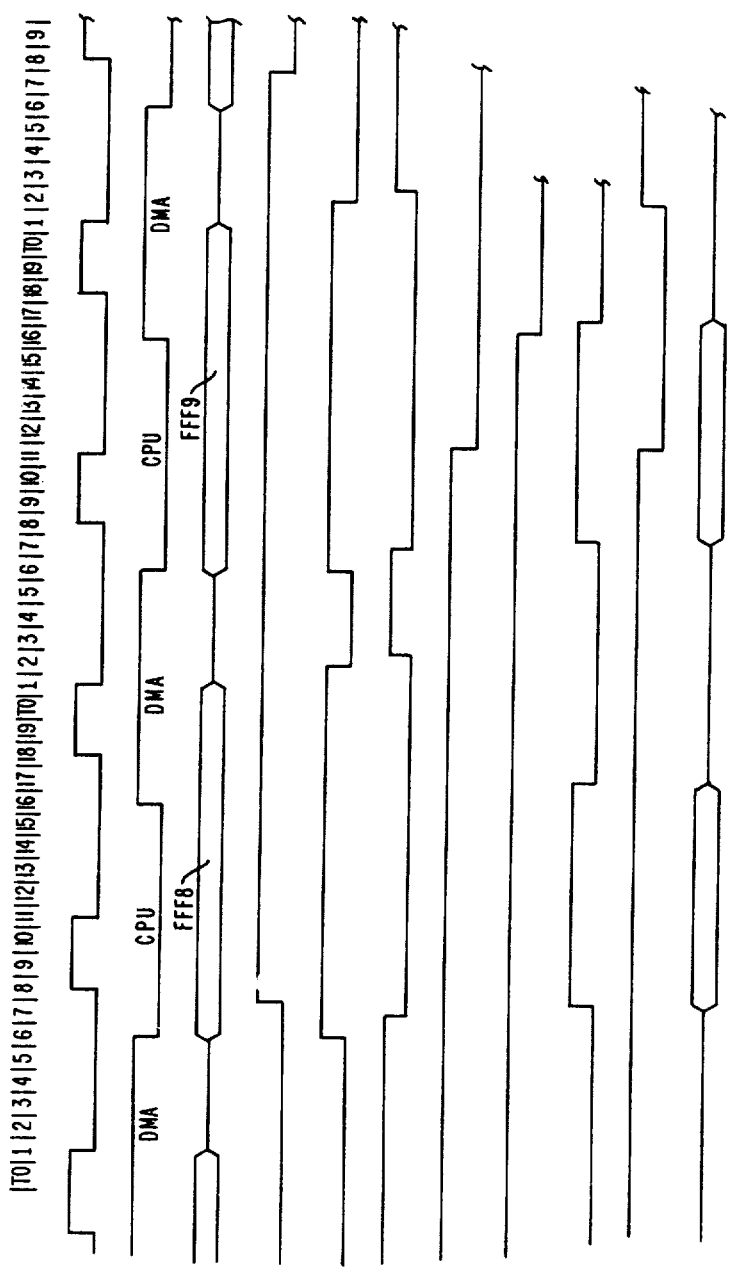
FIG. 8 is a timing diagram of the option interrupt system.

Referring to FIG. 8 which is a timing diagram of an option request for an interrupt, signal MYIRQS is set to logical ONE. This causes signal MYIRQF to be set at the rise of signal CPUADR−. Signal EXTIRQ is forced to logical ZERO when signal MYIRQF is at logical ONE. Signal EXTIRQ at logical ZERO forces signal CPUIRQ− to logical ZERO causing CPU 4-2 to place hexadecimal address FFF8 on the address bus (CPUAXX) during a CPU cycle by means of signal CPUADR. Hexadecimal address FFF8 is sensed by the logic, and signal IRQACK is generated which forces option acknowledge signal PRIACK−05 to logical ZERO. This forces signal MYIRQA to logical ONE at the fall of signal CPUADR− which gates option bus address signal BUSA1−8 out on the address bus 18. Signal INTACK is forced to logical ONE to prevent other subsystems with higher priority from interrupting.

Hexadecimal address FFF9 is generated by the CPU 4-2 and placed on the address bus during the next CPU cycle. This conditions signal MYIRQF+ to logical ZERO on the fall of signal DEVSTR−. Also address signal BUSA1−8 is again placed on the external address bus. On the previous CPU cycle address signal BUSA1−8 indicated an even address. During this CPU cycle address signal BUS1−8 indicates the next consecutive address. This address is incremented by placing a logical ONE in the BUSA00+00 position. MYIRQA at logical ZERO forces signal MYIRQS to logical ZERO and conditions MYIRQF+ to logical ZERO (EXTIRQ to logical ONE) or the rise of signal CPUADR−. Signal MYIRQG+ is forced to logical ONE on the fall of signal DEVSTR—. Signal IRQACK remains at logical ZERO on the third CPU cycle which conditions INTACK to logical ZERO at SRBIT7 time.

While in accordance with the provisions and statute, there has been illustrated and described the best form of the invention known, certain changes may be made to the system described without departing from the spirit of the invention as set forth in the appended claims and in some cases, certain features of the invention may be used to advantage without a corresponding use of other features.

What is claimed is:

1. A cathode ray tube display terminal system comprising:
    a system bus;
    a memory subsystem, including a plurality of memory locations for storing a plurality of interrupt routines, coupled to said system bus;
    a central processor subsystem coupled to said system bus and to said memory subsystem including central processor means for generating interrupt address signals indicative of a memory location of said memory system;
    a first plurality of peripheral subsystems coupled in common to said system bus, to said central processor subsystem and to said memory subsystem, each of said first plurality of peripheral subsystems including means for generating a unique interrupt request signal in a first state when requesting access to said memory subsystem; and,
    said central processor subsystem including interrupt means responsive to said unique interrupt request signal in said first state from a selected one of said first plurality of peripheral subsystems having a predetermined priority for modifying said interrupt address signals, said modified interrupt address signals being indicative of a first starting address location referencing a selected one of said plurality of interrupt routines for processing the interrupt request of said selected one of said first plurality of peripheral subsystems by said central processor subsystem.

2. The system of claim 1 wherein said system further comprises:
    a second plurality of peripheral subsystems coupled to said system bus, to said central processor subsystem and to said memory system, each of said second plurality of peripheral subsystems including means for generating a common interrupt request signal, said interrupt means being responsive to said common interrupt request signal and each of said unique interrupt request signals in said second state for generating an external interrupt acknowledge signal, a selected one of said second plurality of peripheral subsystems having means responsive to said external interrupt acknowledge signal for modifying said interrupt address signals, said modified interrupt address signals being indicative of a second starting address location referencing a second one of said plurality of interrupt routines for coupling said selected one of said second plurality of peripheral subsystems to said central processor subsystem serially connecting said second plurality of peripheral subsystems receive said external interrupt acknowledge signal, said selected one of said second plurality of peripheral subsystems which generates said common input request signal being closest to said external interrupt acknowledge signal generating means having said predetermined priority.

3. The system of claim 2 wherein said
    interrupt means for receiving said unique interrupt request signal in said first state or, said second state and said common interrupt signal includes encoder means for generating a central processor signal; and
    central processor means is coupled to said encoder means and is responsive to said central processor signal for generating said interrupt address signals.

4. The system of claim 3 wherein said interrupt means comprises:
    storage means for storing said unique interrupt request signals in said first state and said common interrupt request signal;
    said encoder means being coupled to said storage means and responsive to said unique request signals in said first state applied to said encoder means in a predetermined sequence for generating coded signals indicative of said unique interrupt request signal for said selected one of said first plurality of peripheral subsystems having said predetermined priority, and responsive to said unique request signals in said second state and said common interrupt request signal for generating coded signals indicative of one of said second plurality of peripheral subsystems having said predetermined priority;
    decoder means coupled to said encoder means and responsive to said interrupt address signals and said coding signals for generating a unique interrupt acknowledge signal indicative of said selected one of said first plurality of peripheral subsystem having said first priority or generating said external interrupt acknowledge signal indicative of said selected one of said second plurality of peripheral subsystems having said predetermined priority; and
    first driver means coupled to said encoder means and responsive to said coded signals indicative of said unique interrupt request signal from said selected one of said first plurality of peripheral subsystems having said predetermined priority for modifying said interrupt address signals.

5. The system of claim 4 wherein said modifying means of said selected one of said second plurality of peripheral subsystems comprises:
    switch means for generating unique coded signals indicative of each of said second plurality of peripheral subsystems;
    second driver means coupled to said switch means and responsive to said external acknowledge signal; and
    said unique coded signals for modifying said interrupt address signals indicative of said second starting address location.

* * * * *